(12) United States Patent
Achiwa et al.

(10) Patent No.: US 11,272,074 B2
(45) Date of Patent: Mar. 8, 2022

(54) SYSTEM, METHOD, AND STORAGE MEDIUM FOR CONVERTING LOW-RESOLUTION IMAGE DATA INTO HIGH-RESOLUTION IMAGE DATA USING NEURAL NETWORK

(71) Applicant: CANON KABUSHIKI KAISHA, Tokyo (JP)

(72) Inventors: Ken Achiwa, Kawasaki (JP); Ryo Kosaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/793,860

(22) Filed: Feb. 18, 2020

(65) Prior Publication Data

US 2020/0280654 A1  Sep. 3, 2020

(30) Foreign Application Priority Data

Feb. 28, 2019 (JP) .............................. JP2019-036854

(51) Int. Cl.
| | | |
|---|---|---|
| H04N 1/40 | (2006.01) | |
| H04N 1/409 | (2006.01) | |
| H04N 1/00 | (2006.01) | |
| G06N 3/08 | (2006.01) | |
| H04N 1/401 | (2006.01) | |

(52) U.S. Cl.
CPC .......... *H04N 1/40068* (2013.01); *G06N 3/08* (2013.01); *H04N 1/00482* (2013.01); *H04N 1/409* (2013.01); *H04N 1/40* (2013.01); *H04N 1/401* (2013.01)

(58) Field of Classification Search
CPC ......... H04N 1/400668; H04N 1/00482; H04N 1/409; H04N 1/40068; H04N 1/4092; H04N 1/40; H04N 1/40; H04N 1/401; G06N 3/08; G06N 3/0454
USPC .......................................................... 358/1.2
See application file for complete search history.

(56) References Cited

U.S. PATENT DOCUMENTS

| | | | | |
|---|---|---|---|---|
| 5,838,333 | A * | 11/1998 | Matsuo ................... | G06T 11/00 345/604 |
| 5,896,403 | A * | 4/1999 | Nagasaki ............. | G11B 7/0033 714/752 |
| 10,074,158 | B2 * | 9/2018 | Siddiqui .................. | G06T 7/593 |
| 2012/0177267 | A1 * | 7/2012 | Chen ..................... | A61B 6/5258 382/131 |
| 2019/0244399 | A1 * | 8/2019 | Li ....................... | G01R 33/5611 |
| 2020/0043135 | A1 * | 2/2020 | Chou .................... | G06T 3/4053 |

FOREIGN PATENT DOCUMENTS

JP          2016-127475 A       7/2016

* cited by examiner

*Primary Examiner* — Marcus T Riley
*Assistant Examiner* — Darryl V Dottin
(74) *Attorney, Agent, or Firm* — Canon U.S.A., Inc. IP Division

(57) ABSTRACT

A system previously generates a plurality of neural networks by performing learning based on an image data pair generated based on identical original data and differing in resolution. Then, the system determines one neural network out of the plurality of neural networks based on a resolution of input image data and a resolution of an image to be output, acquires post-conversion image data based on the determined neural network and the input image data, and performs outputting that is based on the post-conversion image data.

20 Claims, 24 Drawing Sheets

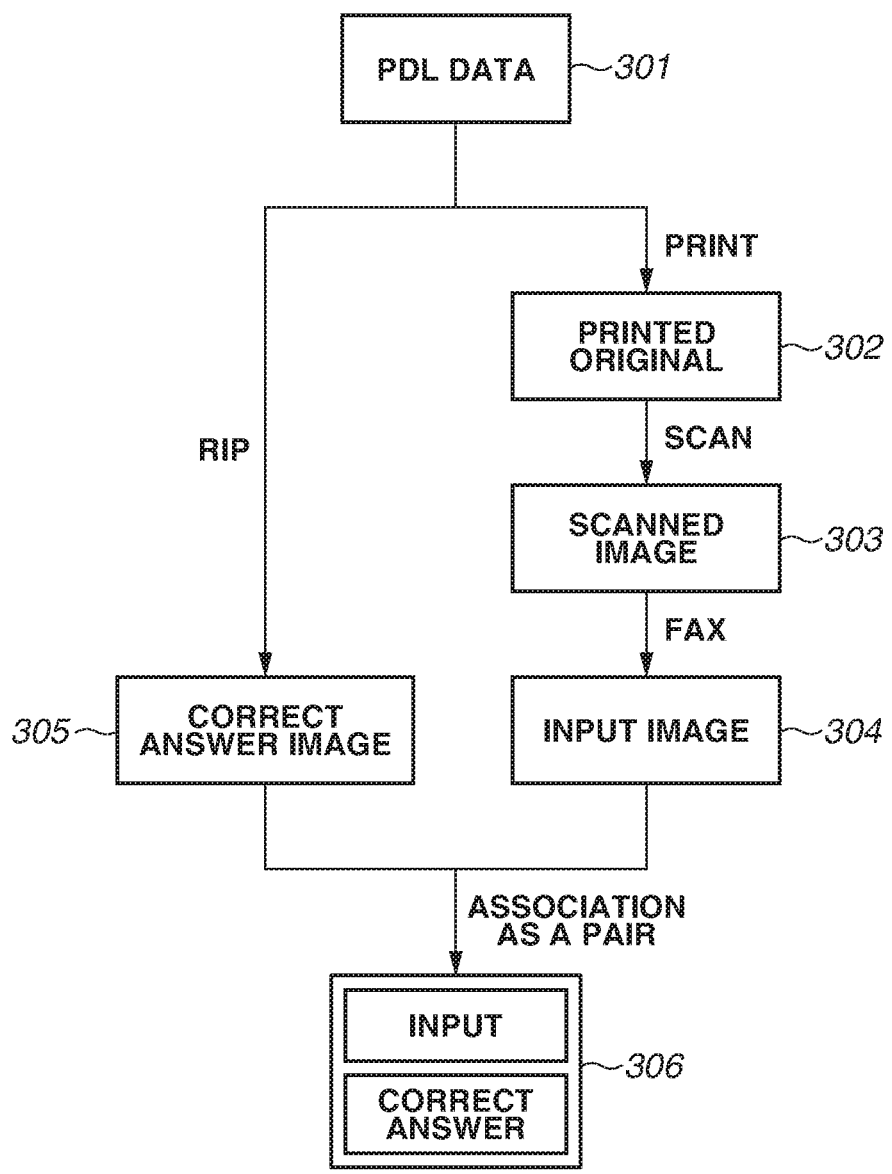

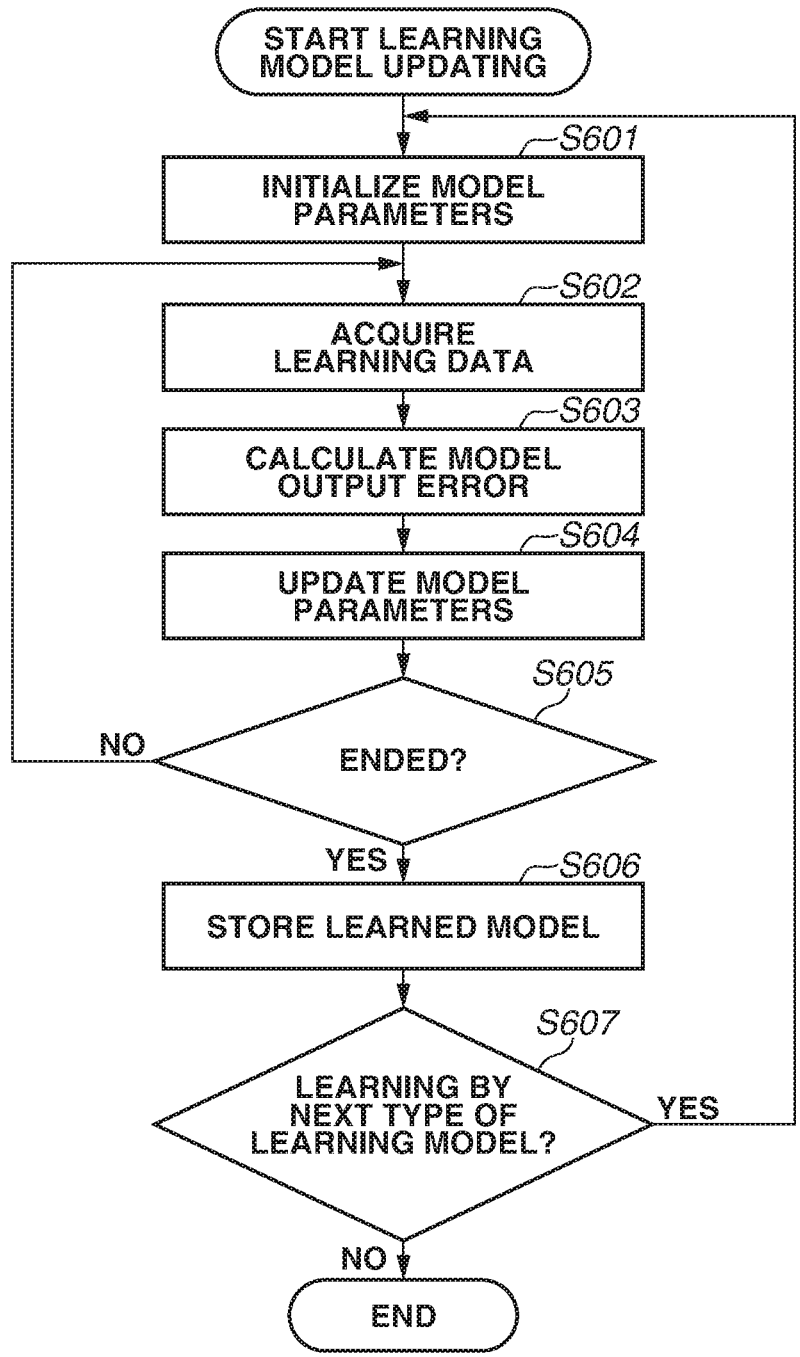

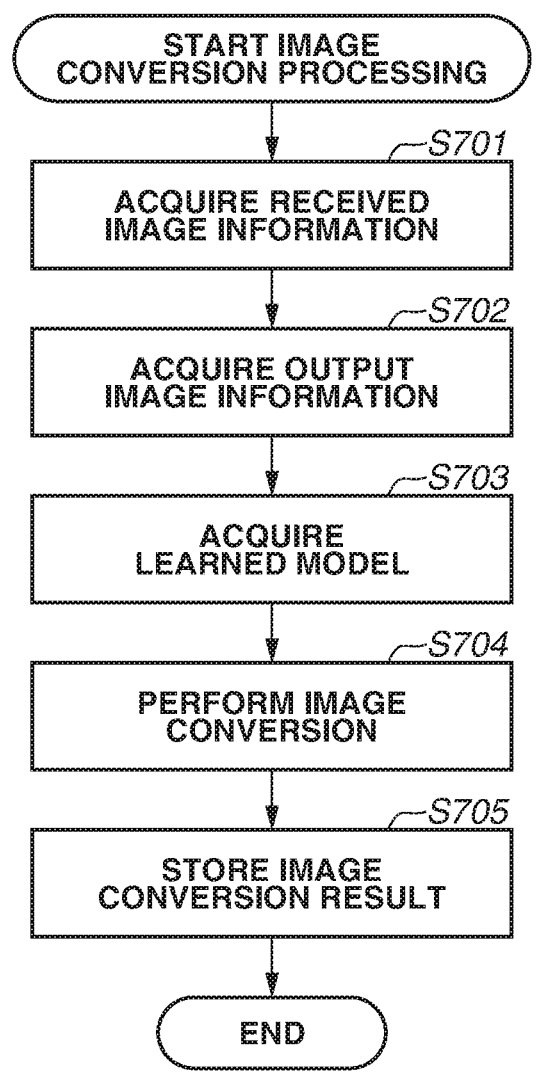

FIG.15B
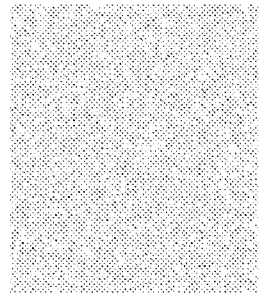
FIG.15C
FIG.15D
FIG.15E
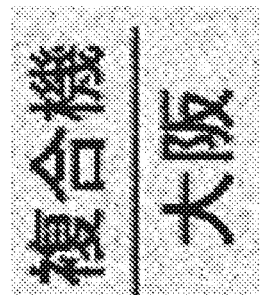
FIG.15F
FIG.15G
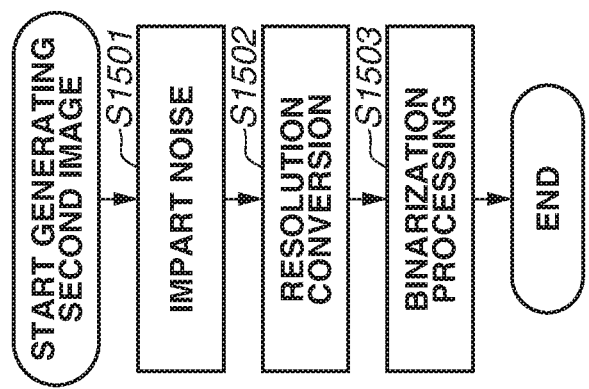
FIG.15A

FIG.16A
START GENERATING SECOND IMAGE → S1601 DETECT NOISE IMPARTING REGION → S1602 IMPART NOISE → S1603 RESOLUTION CONVERSION → S1604 BINARIZATION PROCESSING → END
FIG.16B
複合機
大阪
1611
FIG.16C
複合機
大阪
FIG.16D
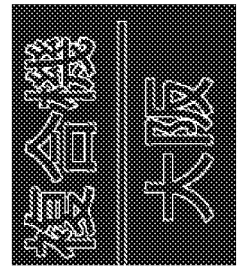
FIG.16E
FIG.16F
複合機
大阪
FIG.16G
複合機
大阪
FIG.16H
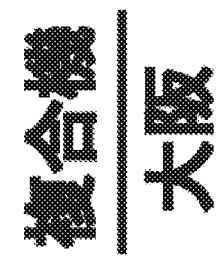
FIG.16I
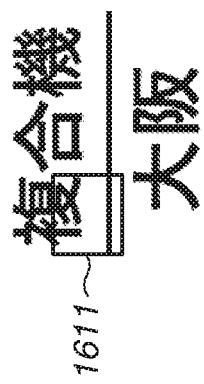
FIG.16J
複合機
大阪

FIG.17A

| OUTPUT RESOLUTION (dpi) / RECEPTION RESOLUTION (dpi) | 1200 × 1200 | 600 × 600 | 400 × 400 | 300 × 300 | 200 × 200 | 100 × 100 |
|---|---|---|---|---|---|---|
| 400 × 400 | A | E | I | M | Q | U |
| 400 × 200 | B | F | J | N | R | V |
| 200 × 200 | C | G | K | O | S | W |
| 200 × 100 | D | H | L | P | T | X |

FIG.17B

| OUTPUT RESOLUTION (dpi) / RECEPTION RESOLUTION (dpi) | 1200 × 1200 | 600 × 600 | 400 × 400 | 300 × 300 | 200 × 200 | 100 × 100 |
|---|---|---|---|---|---|---|
| 400 × 400 | A | A | A | E | E | E |
| 400 × 200 | B | B | B | F | F | F |
| 200 × 200 | C | C | C | C | C | G |
| 200 × 100 | D | D | D | D | D | H |

FIG.17C

| OUTPUT RESOLUTION (dpi) / RECEPTION RESOLUTION (dpi) | 1200 × 1200 (MIXED) | 600 × 600 (MIXED) | 1200 × 1200 (CONCAVE NOISE) | 600 × 600 (CONCAVE NOISE) | 1200 × 1200 (CONVEX NOISE) | 600 × 600 (CONVEX NOISE) |
|---|---|---|---|---|---|---|
| 400 × 400 | A | E | I | M | Q | U |
| 400 × 200 | B | F | J | N | R | V |
| 200 × 200 | C | G | K | O | S | W |
| 200 × 100 | D | H | L | P | T | X |

FIG.20A

| | PRINT ANYWHERE | RECEPTION TRAY | FACSIMILE | SCAN AND TRANSMIT | SCAN AND STORE | USAGE OF STORED FILE |

Please select a job.

| SELECT | JOB NAME | PAPER SIZE | NUMBER OF PAGES | RECEPTION RESOLUTION | OUTPUT RESOLUTION |
|---|---|---|---|---|---|
| ☑ | ESTIMATE | A4 | 2 | 200 × 100 dpi | 600 × 600 dpi |
| ☑ | APPLICATION | A4 | 2 | 200 × 200 dpi | 600 × 600 dpi |

2001

OUTPUT SETTING > DETAIL > AI CORRECTION USAGE

ON    OFF

Image conversion for implementing high image quality using AI learning is being performed. If an undesired image is output, please select OFF.

OUTPUT SETTING | JOB DELETION | PRINT | TRANSMIT

FIG.20B

| | PRINT ANYWHERE | RECEPTION TRAY | FACSIMILE | SCAN AND TRANSMIT | SCAN AND STORE | USAGE OF STORED FILE |

Please select a job.

| SELECT | JOB NAME | PAPER SIZE | NUMBER OF PAGES | RECEPTION RESOLUTION | OUTPUT RESOLUTION |
|--------|----------|------------|-----------------|----------------------|-------------------|
| ☑ | ESTIMATE | A4 | 2 | 200 × 100 dpi | 600 × 600 dpi |
| ☑ | APPLICATION | A4 | 2 | 200 × 200 dpi | 600 × 600 dpi |

2002

OUTPUT SETTING > DETAIL > AUTOMATIC LEARNING

ON    OFF

Since optimization of user environment is being conducted by automatic learning, an output result different from a previous output result may be obtained.
If you do not want any further automatic learning, please select OFF.

OUTPUT SETTING    JOB DELETION    PRINT    TRANSMIT

FIG.21A

| | PRINT ANYWHERE | RECEPTION TRAY | FACSIMILE | SCAN AND TRANSMIT | SCAN AND STORE | USAGE OF STORED FILE |
|---|---|---|---|---|---|---|

Please select a job.

| SELECT | JOB NAME | PAPER SIZE | NUMBER OF PAGES | RECEPTION RESOLUTION | OUTPUT RESOLUTION |
|---|---|---|---|---|---|
| ☑ | ESTIMATE | A4 | 2 | 200 × 100 dpi | 600 × 600 dpi |
| ☑ | APPLICATION | A4 | 2 | 200 × 200 dpi | 600 × 600 dpi |

OUTPUT SETTING > DETAIL > TENDENCY OF CORRECTION

| LINE PRIORITY | RECOMMENDATION | INTERLINE SPACE PRIORITY |

LINE PRIORITY: Effectively removing concave noise
RECOMMENDATION: Being compatible with both concave noise and convex noise
INTERLINE SPACE PRIORITY: Effectively removing convex noise

2101

| OUTPUT SETTING | JOB DELETION | PRINT | TRANSMIT |

FIG.21B

| SELECT | JOB NAME | PAPER SIZE | NUMBER OF PAGES | RECEPTION RESOLUTION | OUTPUT RESOLUTION |
|---|---|---|---|---|---|
| ☑ | ESTIMATE | A4 | 2 | 200 × 100 dpi | 600 × 600 dpi |
| ☑ | APPLICATION | A4 | 2 | 200 × 200 dpi | 600 × 600 dpi |

Tabs: PRINT ANYWHERE | RECEPTION TRAY | FACSIMILE | SCAN AND TRANSMIT | SCAN AND STORE | USAGE OF STORED FILE Please select a job.

OUTPUT SETTING > DETAIL > PRECEDENT IMAGE CONVERSION

| ON | OFF |
|---|---|
| 1200 × 1200 dpi | 300 × 300 dpi |
| 600 × 600 dpi | 200 × 200 dpi |
| 400 × 400 dpi | 100 × 100 dpi |

2102

OUTPUT SETTING | JOB DELETION | PRINT | TRANSMIT

SYSTEM, METHOD, AND STORAGE MEDIUM FOR CONVERTING LOW-RESOLUTION IMAGE DATA INTO HIGH-RESOLUTION IMAGE DATA USING NEURAL NETWORK

BACKGROUND OF THE INVENTION

Field of the Invention

Aspects of the embodiments generally relate to a system, a method, and a storage medium each of which converts low-resolution image data into high-resolution image data using a neural network and outputs the high-resolution image data. Such an apparatus is used as, for example, a facsimile apparatus or a copying machine or multifunction peripheral equipped with a facsimile function.

Description of the Related Art

Heretofore, an image processing apparatus (for example, a multifunction peripheral (MFP) having an image transmission function such as a facsimile (FAX) transmission function has been configured to reduce a communication data volume to keep communication cost (a communication time and a communication band) low in transmitting scanned image data via a network. The communication data volume is able to be reduced by, for example, converting image data into low-resolution image data or converting image data from multivalued data into binary data. Moreover, on the other hand, there has been proposed a technique which converts received image data transmitted in a low image quality state into high-image-quality data and outputs the high-image-quality data. Japanese Patent Application Laid-Open No. 2016-127475 discusses a technique which prepares pairs each including a low-resolution patch and a high-resolution patch as a dictionary, searches for a low-resolution patch analogous to a predetermined reference region of low-resolution image data, and combines a high-resolution patch corresponding to the low-resolution patch with the low-resolution image data, thus attaining high-resolution image data.

However, the technique discussed in Japanese Patent Application Laid-Open No. 2016-127475 presupposes pairs each including a low-resolution patch and a high-resolution patch being previously retained. Therefore, with regard to an image having an unexpected composition, i.e., an image for which patches are not previously prepared, it is difficult to convert the image into a high-quality image.

SUMMARY OF THE INVENTION

According to an aspect of the embodiments, a system includes at least one memory that stores a program, and at least one processor that executes the program to perform acquiring first information about a resolution of input image data, acquiring second information about a resolution of an image that is to be output, determining, from among a plurality of neural networks, one neural network based on the first information and the second information and acquiring post-conversion image data based on the determined neural network and the input image data, wherein the plurality of neural networks is obtained by performing learning based on an image data pair generated based on identical original data and differing in resolution, and performing outputting that is based on the post-conversion image data.

Further features of the disclosure will become apparent from the following description of exemplary embodiments with reference to the attached drawings.

BRIEF DESCRIPTION OF THE DRAWINGS

FIG. 3 is a diagram illustrating making-up of learning data.

FIG. 6 is a flowchart illustrating learning model updating.

FIG. 7 is a flowchart illustrating image conversion processing.

FIGS. 13A, 13B, 13C, 13D, and 13E are diagrams illustrating specific examples of a correct answer image and an input image for use in learning.

FIG. 15A is a flowchart illustrating processing for generating an input image in the second exemplary embodiment. FIGS. 15B, 15C, 15D, 15E, 15F, and 15G are diagrams illustrating appearances of image conversion.

FIG. 16A is a flowchart illustrating processing for generating an input image in a third exemplary embodiment. FIGS. 16B, 16C, 16D, 16E, 16F, 16G, 16H, 16I, and 16J are diagrams illustrating appearances of image conversion.

FIG. 17A is a diagram illustrating a relationship between resolutions and learning models in the first exemplary embodiment. FIG. 17B is a diagram illustrating a relationship between resolutions and learning models in a modification example. FIG. 17C is a diagram illustrating a relationship between resolutions and learning models in the third exemplary embodiment.

FIG. 20A is a diagram illustrating a setting screen for artificial intelligence (AI) correction usage. FIG. 20B is a diagram illustrating a setting screen for automatic learning.

FIG. 21A is a diagram illustrating a setting screen for tendency of correction.

FIG. 21B is a diagram illustrating a setting screen for precedent image conversion.

DESCRIPTION OF THE EMBODIMENTS

Various exemplary embodiments, features, and aspects of the embodiments will be described in detail below with reference to the drawings. However, constituent elements set forth in the following description are merely illustrated as examples and should not be construed to limit the scope of the aspect of the embodiments. Replacement, addition, and deletion of constituent elements can be performed within the range in which aspects of the embodiments are able to be attained.

A first exemplary embodiment is configured to convert a low-resolution facsimile (FAX) image into a high-resolution image using a neural network in which learning has been previously performed and output the high-resolution image.

Figure 1:
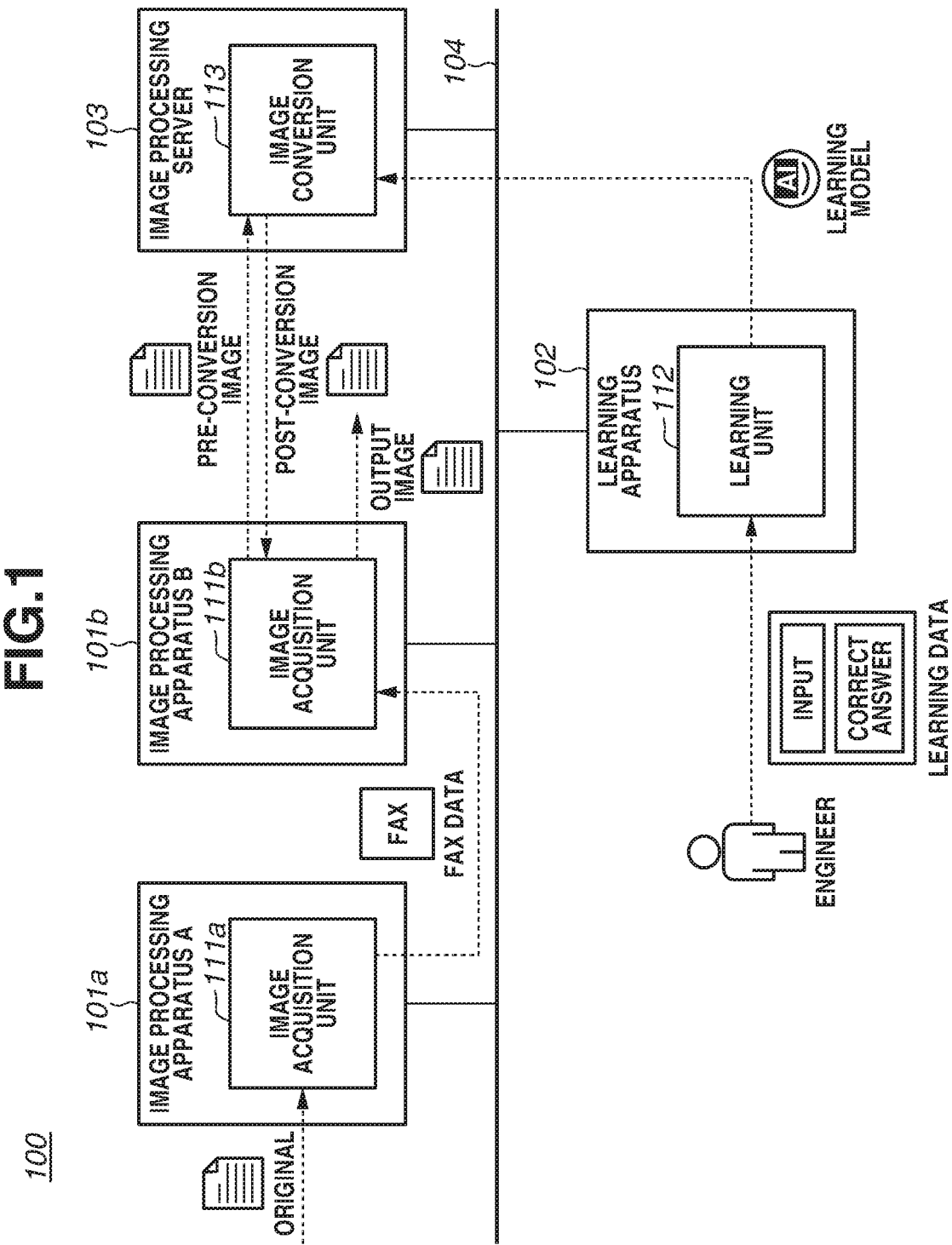
FIG. 1 is a diagram illustrating a configuration of an image processing system according to a first exemplary embodiment.

FIG. 1 is a diagram illustrating a configuration of an image processing system according to the first exemplary embodiment. As illustrated in FIG. 1, the image processing system 100 includes an image processing apparatus 101, a learning apparatus 102, and an image processing server 103, which are connected to each other via a network 104. Furthermore, each of the image processing apparatus 101, the learning apparatus 102, and the image processing server 103 can be a single one or a plurality of ones connected to the network 104. FIG. 1 illustrates an example of a configuration in which two image processing apparatuses 101, i.e., an image processing apparatus A 101a and an image processing apparatus B 101b, are connected to the network 104. The image processing apparatus A 101a and the image processing apparatus B 101b are able to communicate with each other via the network 104, and, for example, FAX data transmitted from the image processing apparatus A 101a is received by the image processing apparatus B 101b. The image processing apparatus B 101b performs outputting (for example, printing or transmission) that is based on the received FAX data. Furthermore, in the following description, for ease of description, when the description refers to a transmission side, it is referred to as the "image processing apparatus A 101a", when the description refers to a reception side, it is referred to as the "image processing apparatus B 101b", and, when the description refers to both the transmission side and the reception side, it is referred to as the "image processing apparatus 101". Moreover, the image processing apparatus A 101a and the image processing apparatus B 101b can communicate with each other via a FAX circuit line different from the network 104.

The image processing apparatus 101 is an apparatus implemented by, for example, a multifunction peripheral (MFP) capable of attaining a plurality of functions, such as copy, print, scan, and FAX, and functions as an image acquisition unit 111 (111a or 111b). The image processing apparatus A 101a generates FAX data by performing image processing on a scanned image acquired by scanning an original in which a character image is contained, and transmits the FAX data to the image processing apparatus B 101b via the network 104. The image processing apparatus B 101b generates a pre-conversion image that is based on the FAX data by performing image processing on the FAX data received from the image processing apparatus A 101a, and transmits the pre-conversion image to the image processing server 103 via the network 104.

The learning apparatus 102 performs learning of image conversion models and thus functions as a learning unit 112, which generates a learning result (for example, parameters of a neural network). The learning apparatus 102 generates a learning result by performing learning using, for example, learning data (training data and an image data pair) which is a pair of an input image and a correct answer image provided by an engineer. The learning apparatus 102 transmits the generated learning result to the image processing server 103 via the network 104.

The image processing server 103 functions as an image conversion unit 113 which performs image conversion on the pre-conversion image acquired by the image processing apparatus 101. The image processing server 103 performs conversion using a neural network on the pre-conversion image with use of the learning result generated by the learning apparatus 102, thus acquiring a post-conversion image. Examples of a machine learning method using a neural network include deep learning using a multi-layered neural network. Then, the image processing server 103 transmits the post-conversion image acquired by conversion to the image processing apparatus 101. The image processing apparatus 101 performs print outputting, transmission to a transmission destination desired by the user, or storing in a storage unit included in the image processing apparatus 101 with use of the post-conversion image received from the image processing server 103.

The network 104 is a communication unit which is implemented by, for example, a local area network (LAN) or a public line (wide area network (WAN)) and which is used to interconnect the image processing apparatus 101, the learning apparatus 102, and the image processing server 103 to allow data transmission and reception therebetween.

Figure 2A:
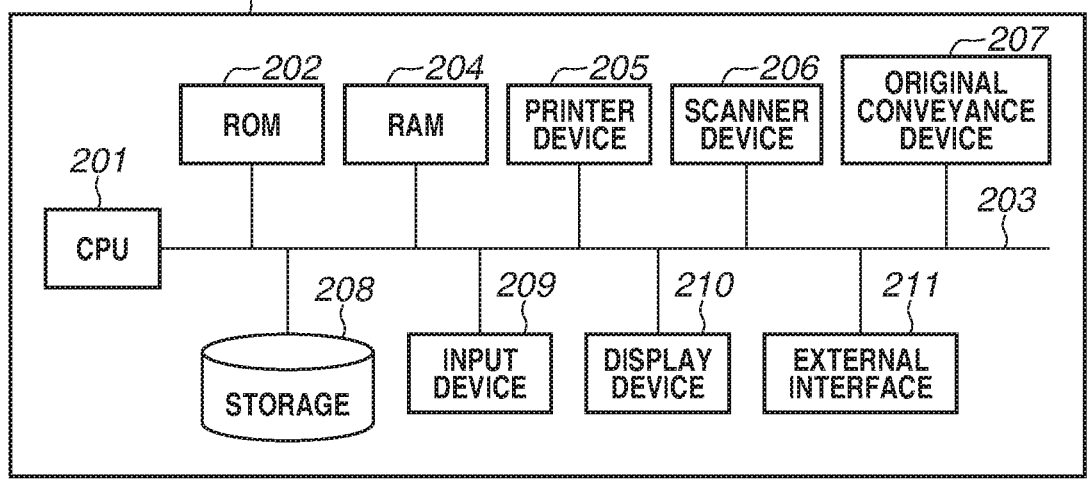
FIG. 2A is a diagram illustrating a configuration of an image processing apparatus.
Figure 2B:
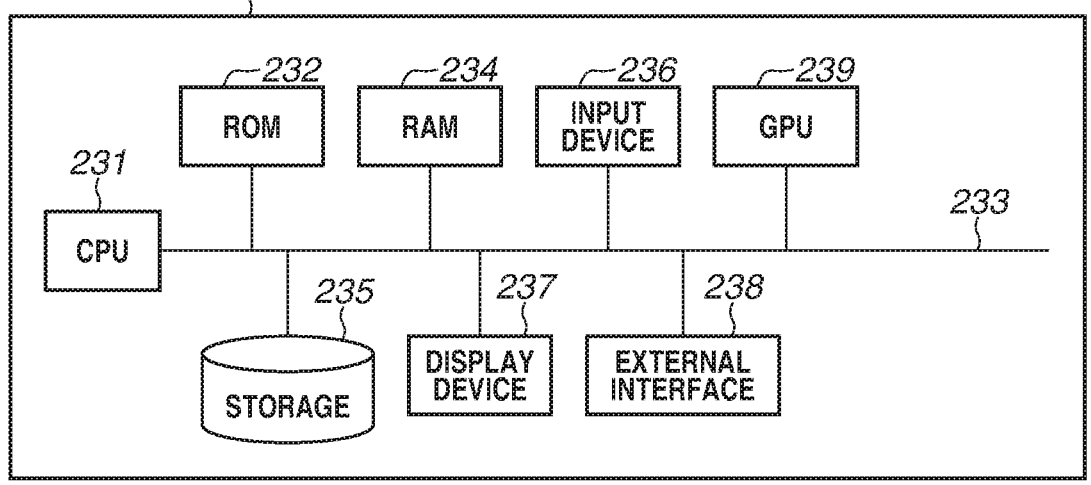
FIG. 2B is a diagram illustrating a configuration of a learning apparatus.
Figure 2C:
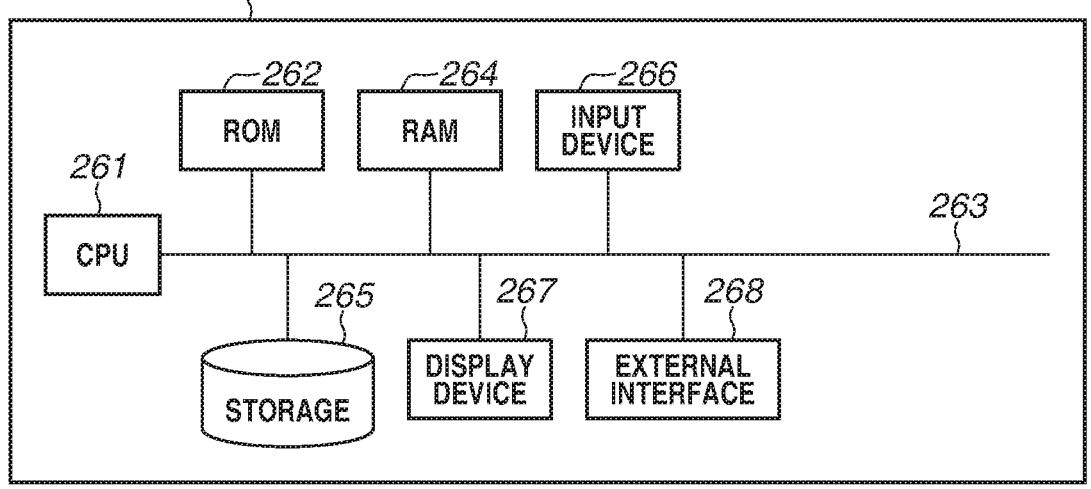
FIG. 2C is a diagram illustrating a configuration of an image processing server.

To implement the above-described image processing system, the image processing apparatus 101, the learning apparatus 102, and the image processing server 103 include the respective configurations described below. FIG. 2A is a diagram illustrating a configuration of the image processing apparatus 101. FIG. 2B is a diagram illustrating a configuration of the learning apparatus 102. FIG. 2C is a diagram illustrating a configuration of the image processing server 103.

As illustrated in FIG. 2A, the image processing apparatus 101 includes a central processing unit (CPU) 201, a read-only memory (ROM) 202, a random access memory (RAM) 204, a printer device 205, a scanner device 206, an original conveyance device 207, a storage 208, an input device 209, a display device 210, and an external interface 211. Such devices are interconnected via a data bus 203 in such a way as to be able to communicate with each other.

The CPU 201 is a controller which comprehensively controls the image processing apparatus 101. The CPU 201 activates an operating system (OS) by a boot program stored in the ROM 202. A control program stored in the storage 208 is executed on the OS. The control program is a program for controlling the image processing apparatus 101. The CPU 201 comprehensively controls various devices interconnected via the data bus 203. The RAM 204 operates as a temporary storage region, such as a main memory or work area, for the CPU 201.

The printer device 205 is a device (a printing device, an image forming unit, or an image forming device) which prints image data on paper (recording material or sheet). The printer device 205 is of any one of, for example, an electrophotographic printing type, which uses, for example, a photosensitive drum or photosensitive belt, and an inkjet type, which directly prints an image on paper by ejecting ink from a minute nozzle array. The scanner device 206 is a device (image reading device), which performs scanning on an original, such as a paper document, with use of an optical reading device such as a charge-coupled device (CCD) sensor to obtain electrical signal data and converts the obtained electrical signal data into scanned image data. Moreover, the original conveyance device 207, such as an automatic document feeder (ADF), conveys an original placed on a document positioning plate of the original conveyance device 207 on a sheet-by-sheet basis to the scanner device 206.

The scanner device 206 can include, in addition to the function of reading an original conveyed by the original conveyance device 207, the function of reading an original placed on a document positioning plate (not illustrated) included in the image processing apparatus 101.

The storage 208 is a non-volatile memory capable of reading and writing, such as a hard disk drive (HDD), on which various pieces of data, such as the above-mentioned control program, are recorded.

The input device 209 is a device configured with, for example, a touch panel or a hardware keypad. The input device 209 serves as a reception unit which receives an operation instruction issued by the user. Then, the input device 209 transfers instruction information including an instruction position to the CPU 201. The display device 210 is a display, such as a liquid crystal display (LCD) or a cathode-ray tube (CRT).

The display device 210 displays display data generated by the CPU 201. The CPU 201 determines which operation has been performed based on instruction information received from the input device 209 and display data displayed by the display device 210. Then, in response to a result of the determination, the CPU 201 controls the image processing apparatus 101, and also generates new display data and causes the display device 210 to display the new display data.

The external interface 211 performs transmission and reception of various pieces of data including image data with an external apparatus via a network, such as a local area network (LAN), a telephone line, or proximity wireless communication such as infrared communication. The external interface 211 receives page-description language (PDL) data (data in which drawing contents are described in page-description language or data of the PDL format) from an external apparatus, such as the learning apparatus 102 or a personal computer (PC) (not illustrated). The CPU 201 interprets PDL data received by the external interface 211 to generate an image. The generated image is printed by the printer device 205 or is stored in the storage 208. Moreover, the external interface 211 receives image data from an external apparatus, such as the Image processing server 103. The received image data is printed by the printer device 205, is stored in the storage 208, or is transmitted to another external apparatus by the external interface 211.

The learning apparatus 102 illustrated in FIG. 2B includes a CPU 231, a ROM 232, a RAM 234, a storage 235, an input device 236, a display device 237, an external interface 238, and a graphics processing unit (GPU) 239. Such various units are capable of mutually transmitting and receiving data via a data bus 233.

The CPU 231 is a controller which controls the entire learning apparatus 102. The CPU 231 activates an OS by a boot program stored in the ROM 232, which is a non-volatile memory. The CPU 231 executes, on the OS, a learning data generation program and a learning program stored in the storage 235. The CPU 231 generates learning data by executing the learning data generation program. Moreover, the CPU 231 learns neural networks for performing image conversion by executing the learning program. The CPU 231 controls various units via a bus such as the data bus 233.

The RAM 234 operates as a temporary storage region, such as a main memory or work area, for the CPU 231. The storage 235 is a non-volatile memory capable of reading and writing, and records the above-mentioned learning program thereon.

The input device 236 is configured with, for example, a mouse and a keyboard. The display device 237 is similar to the display device 210 described with reference to FIG. 2A.

The external interface 238 is similar to the external interface 211 described with reference to FIG. 2A.

The GPU 239, which is an image processing processor, performs learning of neural networks in collaboration with the CPU 231.

The image processing server 103 illustrated in FIG. 2C includes a CPU 261, a ROM 262, a RAM 264, a storage 265, an input device 266, a display device 267, and an external interface 268. Such various units are capable of mutually transmitting and receiving data via a data bus 263.

The CPU 261 is a controller which controls the entire image processing server 103. The CPU 261 activates an OS by a boot program stored in the ROM 262, which is a non-volatile memory. The CPU 261 executes, on the OS, an image processing server program stored in the storage 265. The CPU 261 performs image conversion processing on a processing target image by executing the image processing server program. The CPU 261 controls various units via a bus such as the data bus 263.

The RAM 264 operates as a temporary storage region, such as a main memory or work area, for the CPU 261. The storage 265 is a non-volatile memory capable of reading and writing, and records the above-mentioned image processing server program thereon.

The input device 266 is similar to the input device 236 described with reference to FIG. 2B. The display device 267 is similar to the display device 210 described with reference to FIG. 2A.

The external interface 268 is similar to the external interface 211 described with reference to FIG. 2A.

Figure 4:
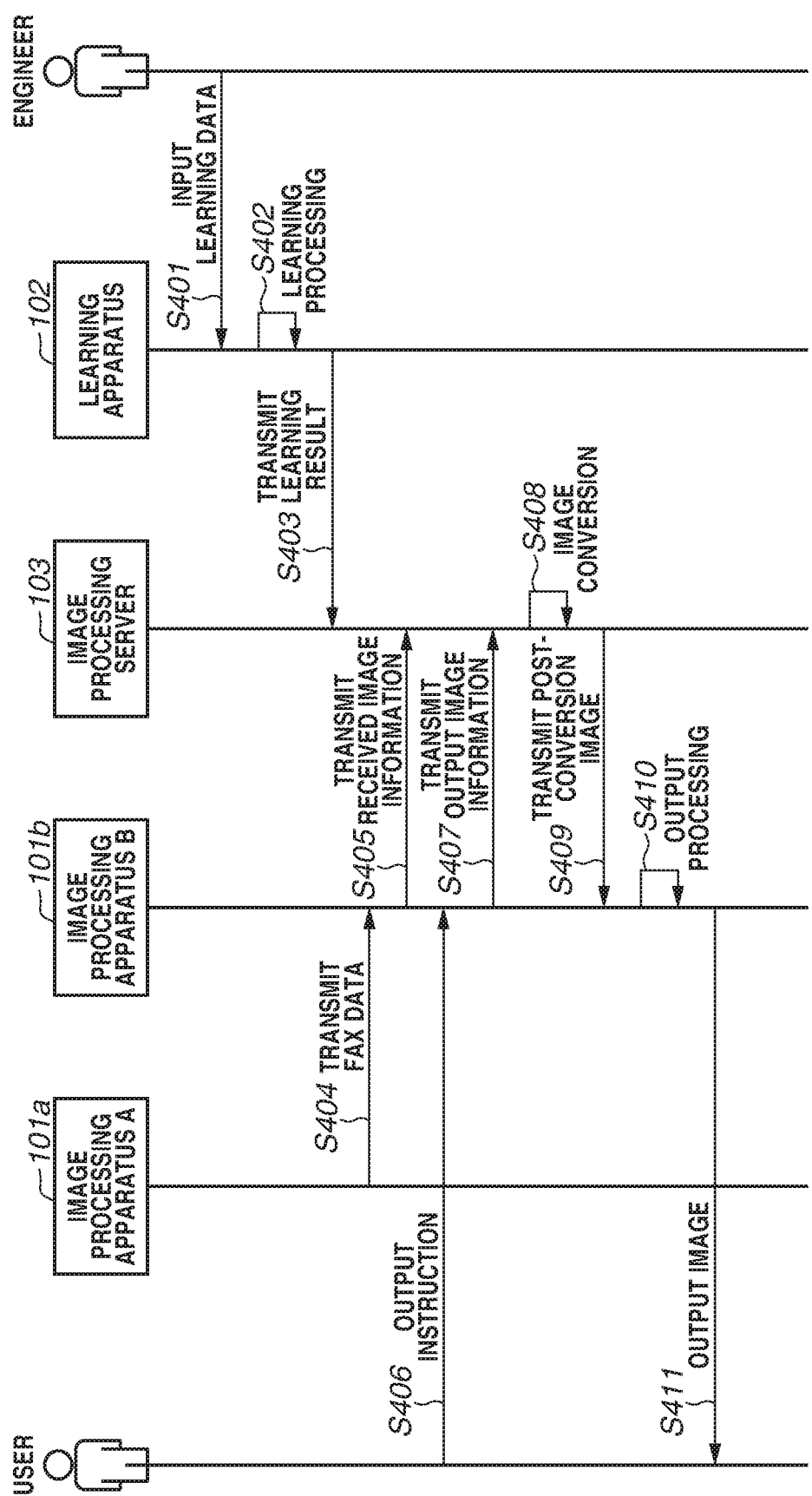
FIG. 4 is a diagram illustrating a usage sequence of the image processing system.

FIG. 4 is a diagram illustrating a usage sequence of the image processing system. Here, a case where the user operates the image processing apparatus B 101b to issue an output instruction with respect to the received FAX data to perform print outputting is described. The first exemplary embodiment is configured to perform image conversion on a low-quality pre-conversion image acquired as FAX data, thus being able to provide a high-quality post-conversion image (post-conversion image data). With this, for example, performing optical character recognition (OCR) on the high-quality post-conversion image enables extracting a text included in the image with a high degree of accuracy.

First, in step S401, the engineer of a manufacturer which provides the image processing system 100 performs inputting of learning data to cause the learning apparatus 102 to perform learning for image conversion artificial intelligence (AI). In step S402, the learning apparatus 102 performs learning processing of a neural network with use of the input learning data. When processing in step S402 ends, then in step S403, the learning apparatus 102 transmits a learning result to the image processing server 103. These steps are steps which are previously performed before steps described below are performed.

Then, in step S404, the image processing apparatus A 101a transmits FAX data to the image processing apparatus B 101b. Upon receiving the FAX data, in step S405, the image processing apparatus B 101b transmits received image information that is based on the received FAX data to the image processing server 103. In step S406, to start using the image processing system 100, the user uses the input device 209 of the image processing apparatus B 101b to issue an instruction for print outputting of a received image that is based on the received FAX data. In step S407, the image processing apparatus B 101b transmits output image information designated by the user to the image processing server 103. In step S408, the image processing server 103 performs image conversion which inputs a low-quality pre-conversion image and outputs a high-quality post-conversion image based on pieces of information received in steps S405 and S407. In step S409, the image processing server 103 transmits the high-quality post-conversion image generated in Step S408 to the image processing apparatus B 101b. In steps S410 and S411, the image processing apparatus B 101b performs print outputting in an output form designated by the user in step S406 with use of the high-quality post-conversion image received in step S409. Furthermore, while, here, print outputting is described as an example, the output form can include transmission to a transmission destination designated by the user and storing in a storage (network storage).

The learning data which the engineer has input to the learning apparatus 102 in step S401 is described. The learning data is data which the learning apparatus 102 uses to learn neural networks. Learning neural networks necessitates a pair of pre-conversion data (a pre-conversion image) and post-conversion data (a post-conversion image). In the first exemplary embodiment, a low-quality image obtained after FAX reception is used as pre-conversion data (a pre-conversion image=an input image), and a high-quality image obtained before FAX transmission is used as post-conversion data (a post-conversion image=a correct answer image).

FIG. 3 is a diagram illustrating making-up of learning data. As illustrated in FIG. 3, learning data 306 is data composed of a pair of a correct answer image and an input image. A correct answer image 305 is directly acquired by performing raster image processing (RIP) (rendering) on PDL data 301 (an electronic document or original data). An input image 304 is generated based on FAX data obtained by scanning a printed original 302 obtained by printing the PDL data 301 to generate a scanned image 303 and then performing conversion of the scanned image 303.

Here, the printed original 302 is obtained by a printing apparatus (not illustrated) which is under a development environment of the engineer. Next, the printed original 302 is read by a scanner (not illustrated) which is under a development environment of the engineer. Then, image processing, such as resolution conversion or binarization, for conversion into FAX data is performed on the scanned image 303 by an information processing apparatus (not illustrated) which is under a development environment of the engineer. In one embodiment, apparatuses for use in such processes are to be of the same models as those of the printer device 205 and the scanner device 206.

Moreover, while performing high-quality image conversion necessitates learning neural networks using large quantities of learning data, here, description is performed on the premise that sufficient learning has previously been performed.

FIG. 6 is a flowchart illustrating the flow of learning processing for a learning model, which is performed by the learning apparatus 102 in step S402 illustrated in FIG. 4. Furthermore, the steps illustrated in FIG. 6 are stored in, for example, the ROM 232, the RAM 234, or the storage 235 of the learning apparatus 102 and are performed by the CPU 231 and the GPU 239 of the learning apparatus 102.

As illustrated in FIG. 6, in step S601, the CPU 231 initializes the values of weight parameters constituting a neural network used as a learning model with use of the GPU 239. In other words, for example, the CPU 231 sets weight parameters constituting a neural network to random values or loads the values obtained by previous learning and performs re-setting. Next, in step S602, the CPU 231 acquires, as learning data, a pair of an input image and a correct answer image which coincide with each other in condition of resolution or gradation out of learning data input in step S401 illustrated in FIG. 4 with use of the GPU 239.

Next, in step S603, the CPU 231 inputs learning data (a pair of an input image and a correct answer image) to the neural network prepared in step S601 and performs computation for calculating an error in pixel value between the input image and the correct answer image with use of the GPU 239. Next, in step S604, the CPU 231 performs computation for updating the values of weight parameters of the learning model with use of the GPU 239. This processing is usually called a back propagation method. Next, in step S605, the CPU 231 determines whether computation processing has ended a predetermined number of times of learning using a predetermined number of pieces of learning data with use of the GPU 239. If it is determined that computation processing has ended the predetermined number of times of learning using the predetermined number of pieces of learning data (YES in step S605), the CPU 231 advances the processing to step S606, and, if it is determined that computation processing has not yet ended (NO in step S605), the CPU 231 returns the processing to step S602, thus repeating computation processing in steps S602 to S604. Next, in step S606, the CPU 231 stores the values of weight parameters constituting a neural network of the learned model in, for example, a storage unit such as the storage 235 with use of the GPU 239. The learned model acquired in step S606 is formed as an image conversion unit which does not replace a known low-resolution image by a known high-resolution image but is capable of converting a low-resolution image including an unknown image into a high-resolution image. Therefore, using the learned model enables acquiring a high-resolution image equivalent to electronic data of an original from an input image transmitted at low resolution. For example, the learned model acquires an image conversion function which removes isolated points in an image occurring due to read noise during scanning. Moreover, the learned model acquires an image conversion function which performs smoothing by preventing or reducing zigzags of an edge portion in a drawing object in an image occurring due to conversion into low resolution or binarization. These image conversion functions are acquired by repeatedly performing steps S602 to S604 to learn the tendency of a difference between an input image and a correct answer image. Next, in step S607, the CPU 231 determines whether to perform updating about a learning model different from the above stored learning model. If it is determined to update a different learning model (YES in step S607), the CPU 231 returns the processing to step S601, thus repeating processing in steps S601 to S606, and, if it is determined not to update a different learning model (NO in step S607), the CPU 231 ends the processing for learning model updating.

Examples of a different learning model include a learning model in which learning is performed with use of learning data differing in a combination of the resolution of a correct answer image and the resolution of an input image. Furthermore, examples of the resolution of a FAX image serving as a conversion source include 200×100 dots per inch (dpi) (normal), 200×200 dpi (fine), 200×400 dpi (super-fine), and 400×400 dpi (ultra-fine). Moreover, examples of the output resolution of an image processing apparatus include 1200× 1200 dpi, 600×600 dpi, 400×400 dpi, 300×300 dpi, 200×200 dpi, and 100×100 dpi. In consideration of a combination of these resolutions, the image processing system 100 is demanded to support 24 types of image conversion. In a case where one learning model is used for one type of image conversion, 24 learning models A to X are to be prepared. In step S607, until all of the required types of learning models are updated, the result of determination becomes YES, so that the CPU 231 proceeds to update processing for a next learning model.

Furthermore, the method of differentiation of learning models can be implemented not based on resolution but based on gradation. For example, the CPU 231 can generate learning data while pairing up a correct answer image and an input image generated under the condition of different gradations (16-bit gradation=65,536 colors, 8-bit gradation=256 colors, and 1-bit gradation=2 colors).

Figure 8A:
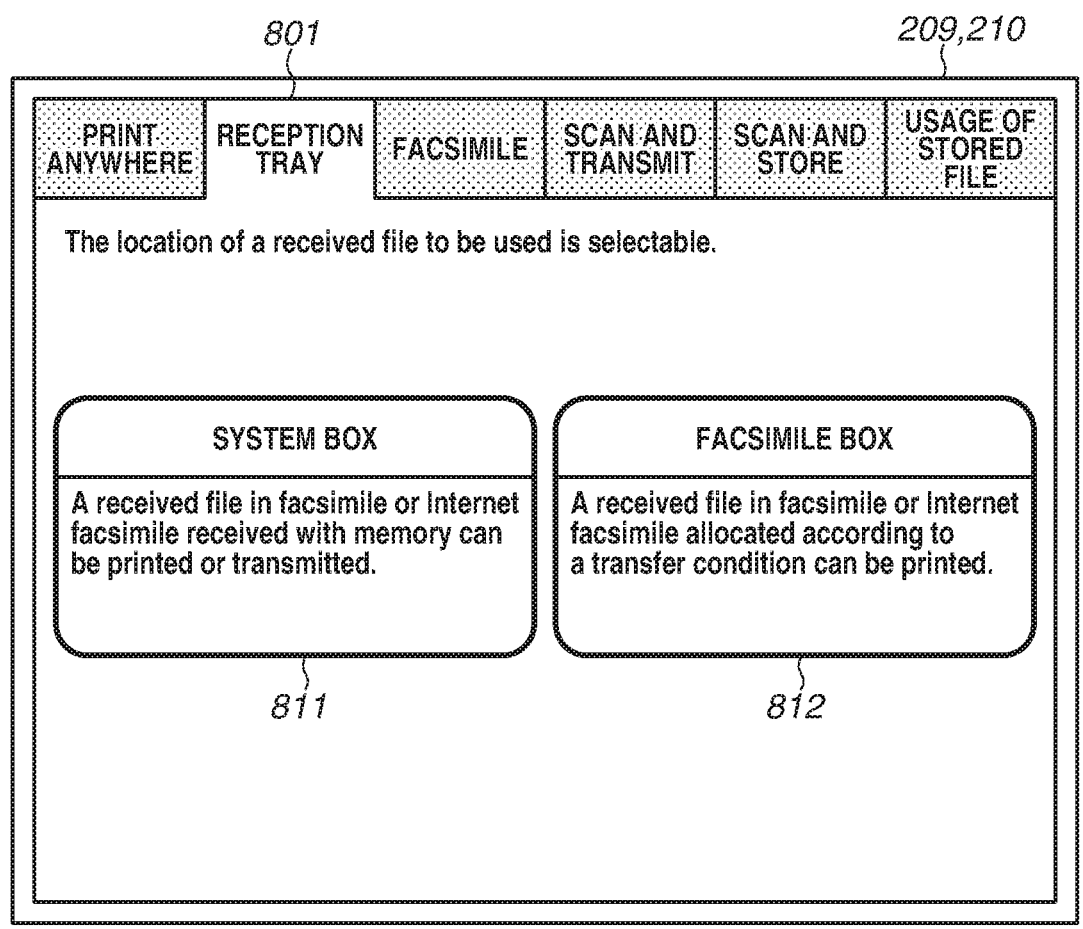
FIG. 8A is a diagram illustrating a screen for a reception function for facsimile (FAX) data.
Figure 8B:
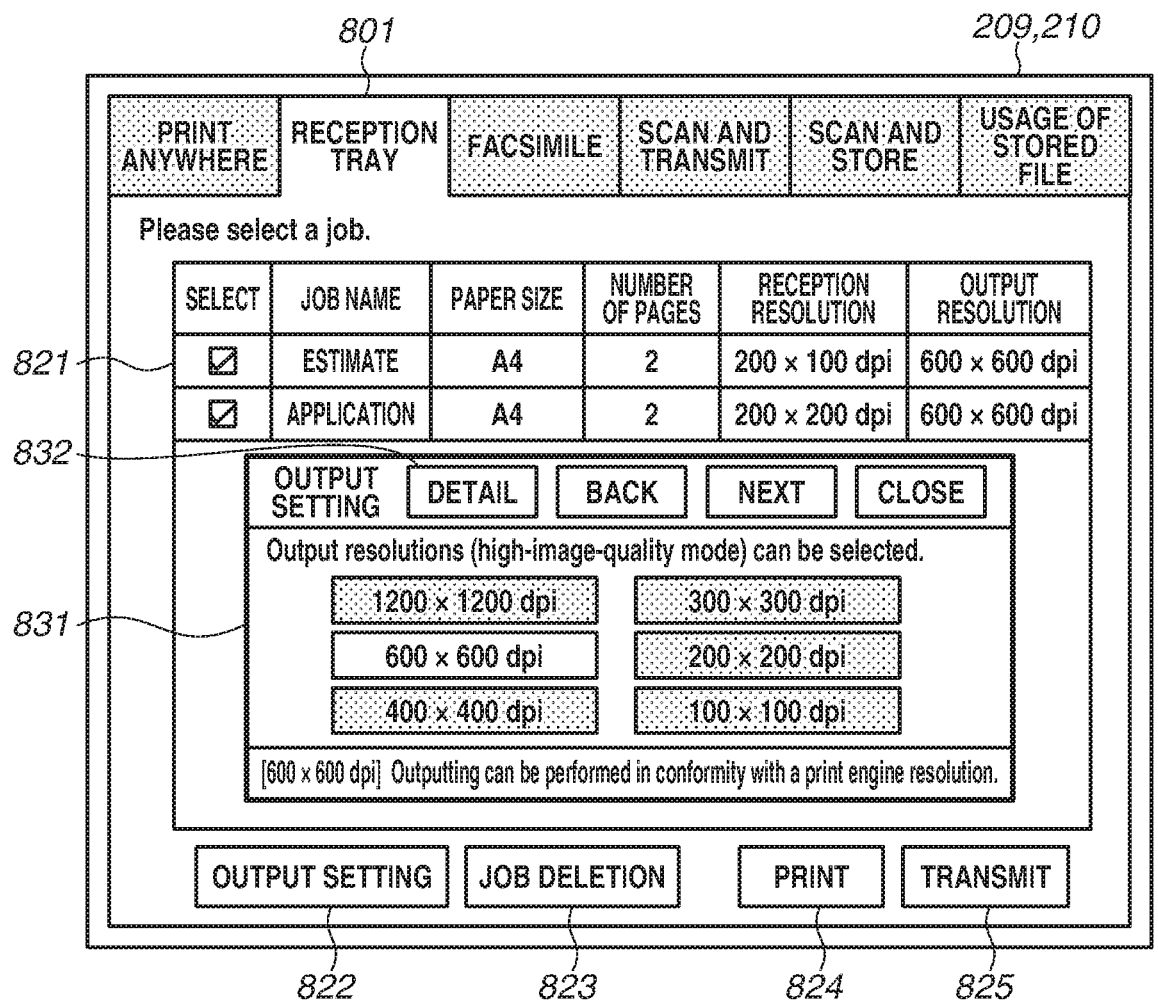
FIG. 8B is a diagram illustrating a reception tray screen for FAX data.

FIGS. 8A and 8B illustrate examples of screens displayed with use of the input device 209 and the display device 210, which are provided to receive an output instruction from the user in step S406 illustrated in FIG. 4.

FIG. 8A illustrates an example of a screen displayed on the display device 210 in a state in which the function menu of a reception tray 801, which is provided to perform, for example, FAX reception, has been selected from among function menus which are able to be implemented by combining one or more functions such as print, scan, and FAX, included in the image processing apparatus B 101b.

As illustrated in FIG. 8A, the function menu of the reception tray 801 includes, for example, a system box 811, via which the user is allowed to issue an output instruction for printing or transmitting FAX image data memory-received with the image processing apparatus B 101b set as a destination. Alternatively, the function menu of the reception tray 801 includes, for example, a facsimile box 812, via which the user is allowed to issue an output instruction for printing or transmitting FAX image data received by the image processing apparatus B 101b in a predetermined transfer condition. Furthermore, with a main body setting changed, it is possible to output (print or transmit) FAX image data not at the timing of an output instruction but at the timing of reception. More specifically, if the main body setting is a first setting, FAX data is then stored in an internal storage. If the main body setting is a second setting, FAX data is printed along with being received. If the main body setting is a third setting, FAX data is transmitted to a previously-designated destination (an e-mail address, a network storage, or a document management cloud service) along with being received.

FIG. 8B illustrates an example of a screen displayed on the display device 210, via which the user is allowed to perform job selection in the reception tray 801, which has been obtained by screen transition from the screen illustrated in FIG. 8A upon detection of a user's touch operation on the system box 811 illustrated in FIG. 8A in the input device 209.

As illustrated in FIG. 8B, a job selection screen in the reception tray 801 is in a state in which, for example, an instruction operation on an output setting button 822, a job deletion button 823, a print button 824, or a transmission button 825 is allowed to be performed with respect to a job list 821 in which job or jobs are able to be selected for outputting. Here, when a user's touch operation on the output setting button 822 is detected, for example, an output setting screen 831 is displayed, thus causing a state in which one of output resolutions (high-image-quality modes) is allowed to be selected. Here, a default state with no selection can be a state in which, for example, a print engine resolution (for example, 600×600 dpi) is selected, or can be a state in which a favorite setting specific to the user is reflected. For example, after issuing an instruction for selecting any one of output resolutions indicated in the output setting screen 831, the user issues an instruction for printing via the print button 824 or an instruction for transmission via the transmission button 825. Then, as indicated in step S406 illustrated in FIG. 4, the image processing apparatus B 101b enters a state of receiving an output instruction from the user, and, in step S407, becomes able to acquire output image information. Furthermore, specifically, when the print button 824 is selected, a print setting screen (not illustrated), via which a print setting is able to be changed, is displayed, and, when a print execution button is selected in the print setting screen, printing is started. Moreover, when the transmission button 825 is selected, a designation screen (not illustrated), via which a destination is able to be designated, is displayed, and, when a transmission execution button is selected in the designation screen, transmission is started. Examples of the destination to be designated can include, in addition to an e-mail address, a FAX number, a network folder, and a cloud service.

Furthermore, while FIGS. 8A and 8B illustrate only an example of selection of resolutions, additionally, a configuration in which one of gradations (for example, 1-bit gradation and 8-bit gradation) or one of the numbers of channels (for example, K=1 channel, RGB=3 channels, and CMYK=4 channels) is able to be selected can be employed.

Figure 5:
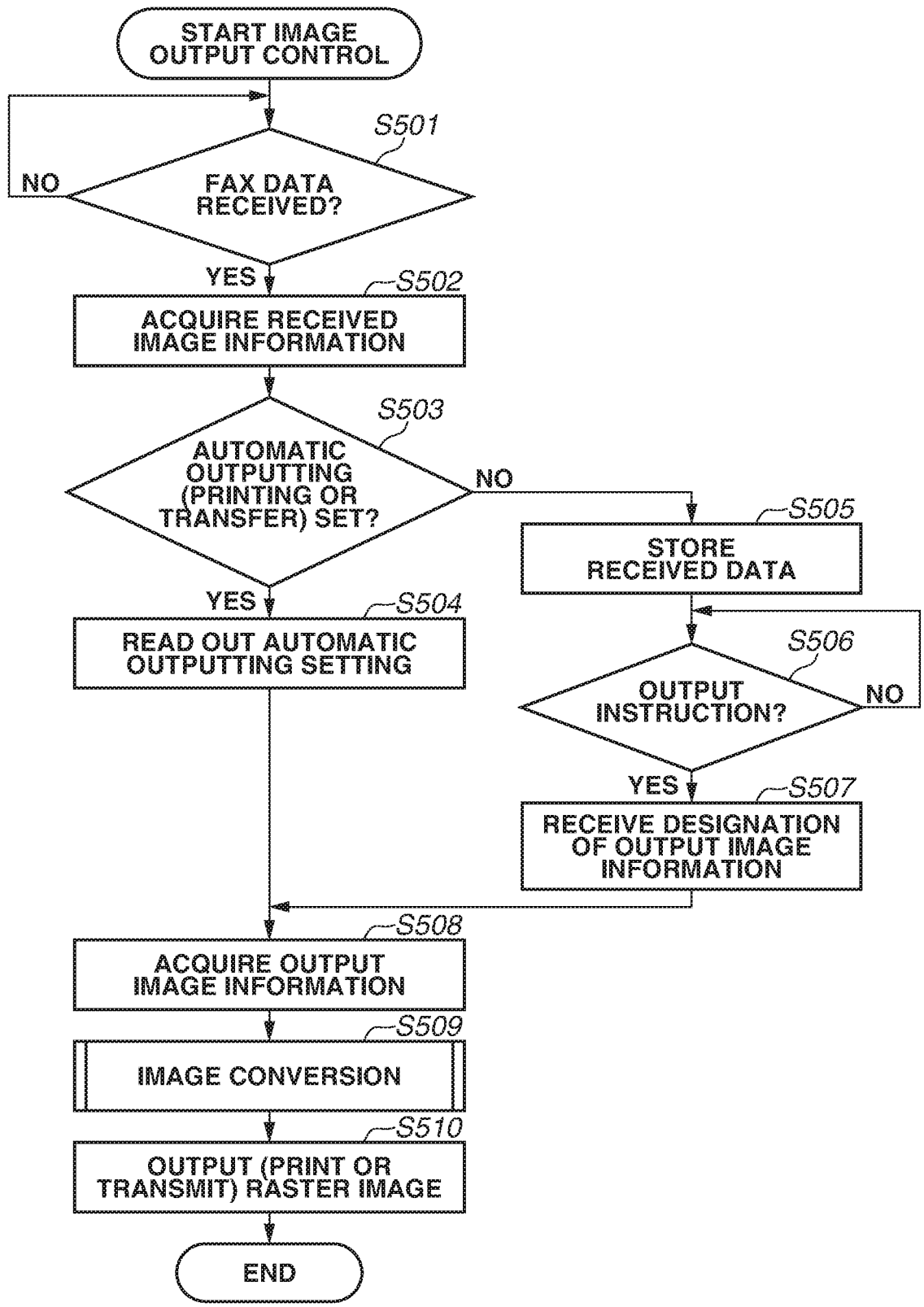
FIG. 5 is a flowchart illustrating image output control.

FIG. 5 is a flowchart illustrating the flow of image output processing which is performed by the image processing apparatus 101. Furthermore, the steps illustrated in FIG. 5 are stored in, for example, the ROM 202, the RAM 204, or the storage 208 of the image processing apparatus 101 and are performed by the CPU 201 of the image processing apparatus 101. Furthermore, a configuration in which some of the steps illustrated in FIG. 5 are stored in, for example, the ROM 232, the RAM 234, or the storage 235 of the image processing server 103 and are performed by the CPU 231 of the image processing server 103 based on a request from the CPU 201 can be employed.

As illustrated in FIG. 5, in step S501, the CPU 201 determines whether FAX data has been received by the external interface 211 via the network 104. If it is determined that FAX data has been received (YES in step S501), the CPU 201 advances the processing to step S502, and, if it is determined that FAX data has not been received (NO in step S501), the CPU 201 returns the processing to step S501, thus waiting until FAX data is received. Next, in step S502, the CPU 201 acquires received image information that is based on the FAX data received in step S501, and transmits the received image information to the image processing server 103. Here, the received image information represents, for example, attribute information such as a resolution, a gradation (for example, 1 bit=binary or 8 bits=256 gradation levels), and the number of channels (for example, monochromatic=1 channel or color=3 channels) included in the received image. Particularly, with regard to FAX data, since image conversion on the received low-resolution image data with a high degree of accuracy is performed, resolution information (for example, 200×100 dpi) included in control information of the FAX data is acquired.

Next, in step S503, the CPU 201 checks a response setting for a response which is to be performed at the time of reception of FAX data. If it is determined that the response setting is automatic print setting or automatic transfer setting (YES in step S503), the CPU 201 advances the processing to step S504. In step S504, the CPU 201 reads out output image information (for example, 600×600 dpi=print engine resolution) associated with automatic print setting or output image information (for example, 300×300 dpi=transmission standard specification) associated with automatic transfer setting. Furthermore, such output image information can be information of the type in which a designated value previously designated by the user is retained and is then read out.

If it is determined that the response setting is neither automatic print setting nor automatic transfer setting and is hold setting (NO in step S503), the CPU 201 advances the processing to step S505. In step S505, the CPU 201 stores the received FAX data in a storage region of the storage 208. Next, in step S506, the CPU 201 determines whether an output instruction issued by the user has been received via the input device 209. If it is determined that the output instruction has not been received (NO in step S506), the CPU 201 waits for reception of the output instruction, and, if it is determined that the output instruction has been received (YES in step S506), the CPU 201 advances the processing to step S507. In step S507, the CPU 201 acquires output image information designated with the output instruction received in step S506.

Next, in step S508, the CPU 201 acquires attribute information that is based on the output instruction received in step S506 or the standard specification designated with the output instruction, and transmits the acquired attribute information to the image processing server 103. Examples of the attribute information include an output resolution, a gradation (for example, 1-bit gradation or 8-bit gradation), and the number of channels (for example, monochromatic=1 channel or color=3 channels). Here, for example, when an output instruction for hold data is print outputting using the printer device 205 and no designation is performed by the user, the CPU 201 acquires a default setting value (600×600 dpi). When an output instruction for hold data is print outputting using the printer device 205 and a designation is performed by the user at the time of the output instruction, the CPU 201 acquires the designated output resolution (for example, 1200×1200 dpi). Moreover, for example, when the output instruction is transmission outputting using the external interface 211 and no designation is performed by the user, the CPU 201 acquires a default setting value (300×300 dpi). When the output instruction is transmission outputting using the external interface 211 and a designation is performed by the user at the time of the output instruction, the CPU 201 acquires the designated output resolution (for example, 600×600 dpi). In this way, if an explicit destination of an output resolution is performed by the user, the CPU 201 can acquire the designated output resolution, and, if no explicit destination is performed by the user, the CPU 201 can acquire a previously determined output resolution. Furthermore, an explicit output resolution designated by the user can be a resolution which is able to be changed according to the use application of image data targeted for an output instruction. Accordingly, instead of the output resolution being designated by the user, an item used for indirectly designating the output resolution can be designated by the user. For example, the user can designate the output resolution by selecting one mode from among a plurality of modes including image-quality priority (high quality, low speed, and large file size) and speed priority (low quality, high speed, and small file size). Next, in step S509, the CPU 201 performs control in such a way as to perform image conversion for converting low-resolution image data into high-resolution image data. Furthermore, the flow of processing in step S509 is separately described in detail with reference to the flowchart of FIG. 7. Finally, in step S510, the CPU 201 performs printing or transmission according to the output type acquired in step S508 with use of a post-conversion image generated in step S509.

FIG. 7 is a flowchart illustrating the flow of image conversion processing which is performed by the image processing server 103 in step S408 illustrated in FIG. 4 and step S509 illustrated in FIG. 5. Furthermore, the steps illustrated in FIG. 7 are stored in, for example, the ROM 262, the RAM 264, or the storage 265 of the image processing server 103 and are performed by the CPU 261 of the image processing server 103.

As illustrated in FIG. 7, in step S701, the CPU 261 acquires, as received image information, low-resolution image data received from the image processing apparatus B 101b and, for example, a resolution, a gradation, and the number of channels which are attribute information of the received image data. Next, in step S702, the CPU 261 acquires, as output image information, for example, an output resolution, a gradation, and the number of channels included in the output instruction issued by the user received from the image processing apparatus B 101b. Furthermore, the output image information can be not information directly indicating attribute information such as an output resolution, a gradation, and the number of channels but function information (a printing function and a transmission function) indirectly associated with such attribute information. Next, in step S703, the CPU 261 acquires, from a storage unit such as the storage 265, a learned model in which conditions such as resolutions, gradations, and the numbers of channels included in the received image information and the output image information acquired in steps S701 and S702 coincide with each other. Furthermore, with regard to the output image information, a learned model in which conditions coincide with each other can be acquired not based on attribute information such as an output resolution, a gradation, and the number of channels but simply based on function information about printing and transmission. Here, in a case where resolution information indicating 200×100 dpi as an input resolution and resolution information indicating 1200×1200 dpi as an output resolution have been acquired, a learned model D is employed as seen in FIG. 17A.

Next, in step S704, the CPU 261 generates, as an image conversion result using a learned model, an output image obtained by inputting the image data acquired in step S701 as an input image to the learned model acquired in step S703. Finally, in step S705, the CPU 261 temporarily stores the image conversion result generated in step S704 in a storage unit such as the storage 265 and also transmits the image conversion result to the image processing apparatus B 101b via the network 104. With a series of processing operations described above illustrated in FIG. 7, the image processing apparatus B 101b is able to acquire an image conversion result using a learning model as a result obtained by performing image conversion for converting low-resolution image data into high-resolution image data.

As described above, according to the first exemplary embodiment, the image processing system is able to convert image data received in low resolution into high-resolution image data and then output the high-resolution image data. Particularly, the image processing system is able to output a high-quality image conforming to a use application by switching a learned model which is used based on output resolution information obtained at the time of image outputting. Moreover, the image processing system is able to correct, with a high degree of accuracy, image deterioration (isolated points and zigzags of an edge portion) slightly differing in tendency for every resolution by switching a learned model which is used based on input resolution information obtained at the time of image inputting. Moreover, since the user is allowed to designate output resolution information serving as a determining factor for a learning model, the image processing system is superior in usability. On the other hand, when a previously designated value is used as output resolution information serving as a determining factor for a learning model, the image processing system is also able to be applied to functions such as automatic printing and automatic transfer. Furthermore, a change using a learning model may cause a conversion result unintended by the user. Therefore, as illustrated in FIG. 20A, an ON button and an OFF button be provided in a setting screen for AI correction usage 2001 and switching to such a setting (OFF) as to prevent image conversion using a learning model from being performed be available. Furthermore, the setting screen for AI correction usage 2001 can be called up by selecting a detail screen button 832 of the output setting screen 831 and then selecting an item for AI correction usage from a detail setting screen (not illustrated).

In the above-described first exemplary embodiment, the engineer previously prepares learning data and inputs the learning data to the image processing apparatus. On the other hand, in a second exemplary embodiment described below, the image processing apparatus automatically generates learning data with use of a PDL job which the image processing apparatus has received while being operating. Furthermore, except for the above-described characterizing portion and its related portion, a configuration of the image processing system in the second exemplary embodiment is similar to that of the image processing system in the first exemplary embodiment. Therefore, similar constituent elements are assigned the respective same reference characters and the detailed description thereof is omitted here.

Figure 9:
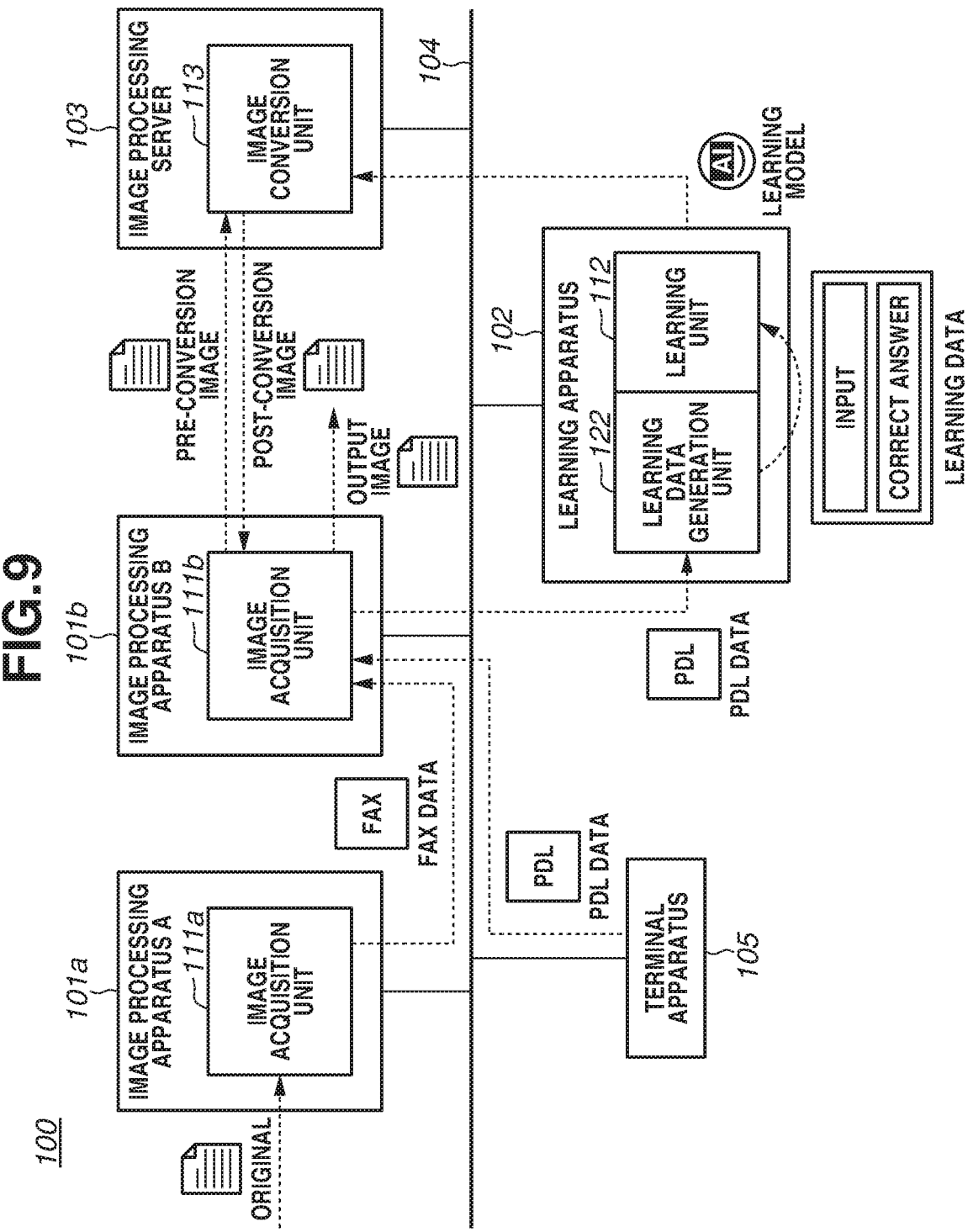
FIG. 9 is a diagram illustrating a configuration of an image processing system according to a second exemplary embodiment.

FIG. 9 is a diagram illustrating a configuration of the image processing system according to the second exemplary embodiment. As illustrated in FIG. 9, the image processing system 100 includes an image processing apparatus 101, a learning apparatus 102, an image processing server 103, and a terminal apparatus 105, which are connected to each other via a network 104. The image processing apparatus 101, the learning apparatus 102, the image processing server 103, and the network 104 are those described above with reference to FIG. 1.

The terminal apparatus 105 is, for example, a personal computer or a tablet capable of transmitting a print job to the image processing apparatus 101. When the user issues a print instruction via an operation unit (not illustrated), the terminal apparatus 105 transmits a print job (including PDL data) to the image processing apparatus 101. The image processing apparatus 101 performs print processing according to a job received from the terminal apparatus 105 and also transmits PDL data to the learning apparatus 102. The learning apparatus 102 generates a correct answer image and an input image from PDL data (original data) and then stores a pair of the generated images as learning data.

In the second exemplary embodiment, the learning apparatus 102 includes a learning data generation unit 122. The learning data generation unit 122 generates, in a pseudo manner, learning data, which is a pair of a correct answer image and an input image, by performing RIP (rendering) and FAX image processing simulation on the acquired PDL data. The learning data generation unit 122 stores the generated learning data in the storage 235. The learning data generation unit 122 is implemented by the CPU 231 loading a learning data generation program onto the RAM 234 and executing the learning data generation program. The learning unit 112 learns a neural network with use of learning data stored in the storage 235. The learning unit 112 is implemented by the CPU 231 loading a learning program onto the RAM 234 and executing the learning program.

Figure 10:
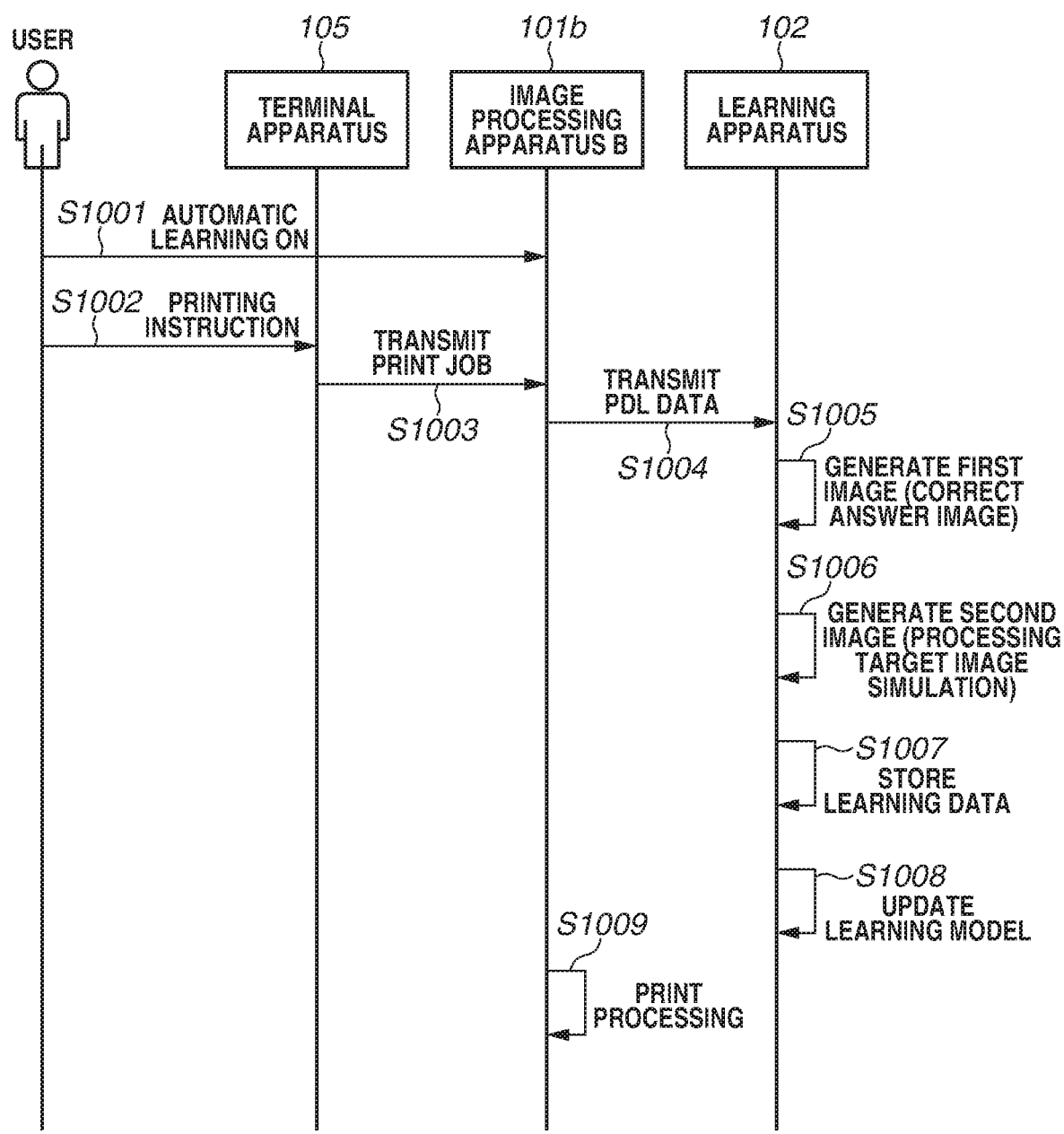
FIG. 10 is a diagram illustrating a learning sequence of the image processing system according to the second exemplary embodiment.

A learning sequence is described with reference to FIG. 10. FIG. 10 is a diagram illustrating a learning sequence of the image processing system in the second exemplary embodiment.

First, in step S1001, the user sets setting of whether to perform learning data generation processing (ON or OFF) to "ON" via an operation unit of the image processing apparatus B 101b. Furthermore, this setting can be previously registered as an initial value with the image processing apparatus B 101b. Next, when, in step S1002, the user issues a printing instruction via the operation unit of the terminal apparatus 105, then in step S1003, the terminal apparatus 105 transmits a print job (including PDL data) to the image processing apparatus B 101b. Upon receiving the print job from the terminal apparatus 105, in step S1004, the image processing apparatus B 101b transmits a learning data generation instruction and PDL data included in the print job to the learning apparatus 102, and, then in step S1009, performs print processing. In step S1005, the learning apparatus 102 performs RIP (rendering) on the PDL data, thus generating a first image serving as a correct answer image. In step S1006, the learning apparatus 102 performs FAX image processing simulation on the PDL data, thus generating a second image serving as an input image. Then, in step S1007, the learning apparatus 102 stores, as learning data, a pair of the correct answer image and the input image generated in steps S1005 and S1006 in the storage 235. In step S1008, the learning apparatus 102 performs learning using the learning data and thus updates a learning model. The updated learning model is transmitted to the image processing server 103 at timing when learning has been completed or at timing when a request is received from the image processing server 103. Furthermore, in parallel with processing performed by the learning apparatus 102, in step S1009, print processing that is based on the print job received in step S1003 is performed by the image processing apparatus B 101b.

Figure 11:
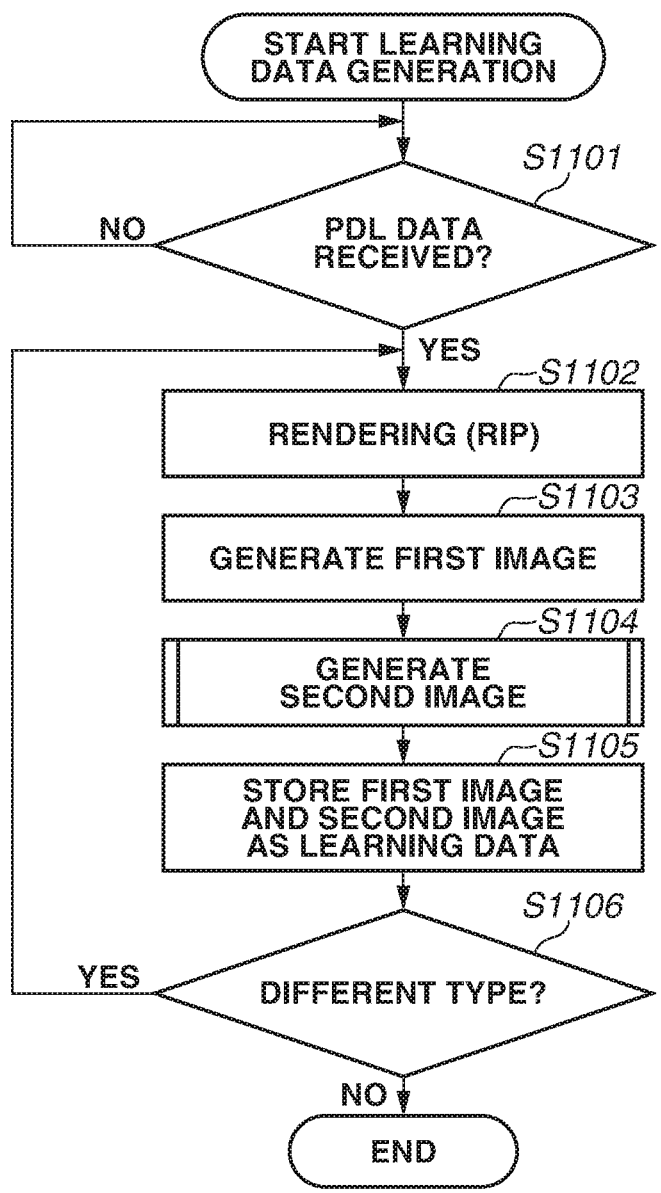
FIG. 11 is a flowchart illustrating learning data generation in the second exemplary embodiment.

FIG. 11 is a flowchart illustrating the flow of learning data generation processing. Furthermore, the steps illustrated in FIG. 11 are stored in, for example, the ROM 232, the RAM 234, or the storage 235 of the learning apparatus 102 and are performed by the CPU 231 and the GPU 239 of the learning apparatus 102.

As illustrated in FIG. 11, in step S1101, the CPU 231 determines whether PDL data has been received from the image processing apparatus B 101b by the external interface 238 via the network 104. If it is determined that PDL data has been received (YES in step S1101), the CPU 231 advances the processing to step S1102, and, if it is determined that no PDL data has been received (NO in step S1101), the CPU 231 returns the processing to step S1101, thus waiting until PDL data is received. Next, in step S1102, the CPU 231 interprets the PDL data to convert the PDL data into a display list and then performs rendering (RIP) on the display list, thus generating raster-format image data. Next, in step S1103, the CPU 231 generates a first image as a correct answer image (for example, 1200×1200 dpi and 8-bit gradation) based on the raster-format image data generated in step S1102. Next, in step S1104, the CPU 231 generates a second image as an input image (for example, 200×200 dpi and 1-bit gradation) based on the raster-format image data generated in step S1102. Furthermore, the flow of processing in step S1104 is separately described below in detail with reference to the flowchart of FIG. 15A. Here, image data to be generated in steps S1103 and S1104 is generated as a plurality of pieces of image data clipped for every predetermined rectangular unit (for example, 512×512 pixels) in a reference region (positional coordinates of main scanning and sub-scanning) within every page including the same drawing object. Next, in step S1105, the CPU 231 stores, as learning data, a pair of an input image and a correct answer image, in which the first image generated in step S1103 is set as the correct answer image and the second image generated in step S1104 is set as the input image, in a storage unit such as the storage 235. Next, in step S1106, the CPU 231 determines whether to generate learning data for a different learning model. If it is determined to continuously generate learning data for a different learning model (YES in step S1106), the CPU 231 returns the processing to step S1102, thus repeating steps S1102 to S1105. If it is determined not to generate learning data for a different learning model any more (NO in step S1106), the CPU 231 ends the processing for learning data generation. Here, learning data for a learning model A is, as seen in FIG. 17A, a pair of an input image with 400×400 dpi and a correct answer image with 1200×1200 dpi. Learning data for a learning model G is, as seen in FIG. 17A, a pair of an input image with 200×200 dpi and a correct answer image with 600×600 dpi.

Furthermore, the method of differentiation of learning models can be implemented not based on resolution but based on gradation. Therefore, the CPU 231 can generate learning data from a combination of pieces of image data with different gradations (16-bit gradation=65,536 colors, 8-bit gradation=256 colors, and 1-bit gradation=2 colors) and learn a learning model that is based on the generated learning data.

Figure 12:
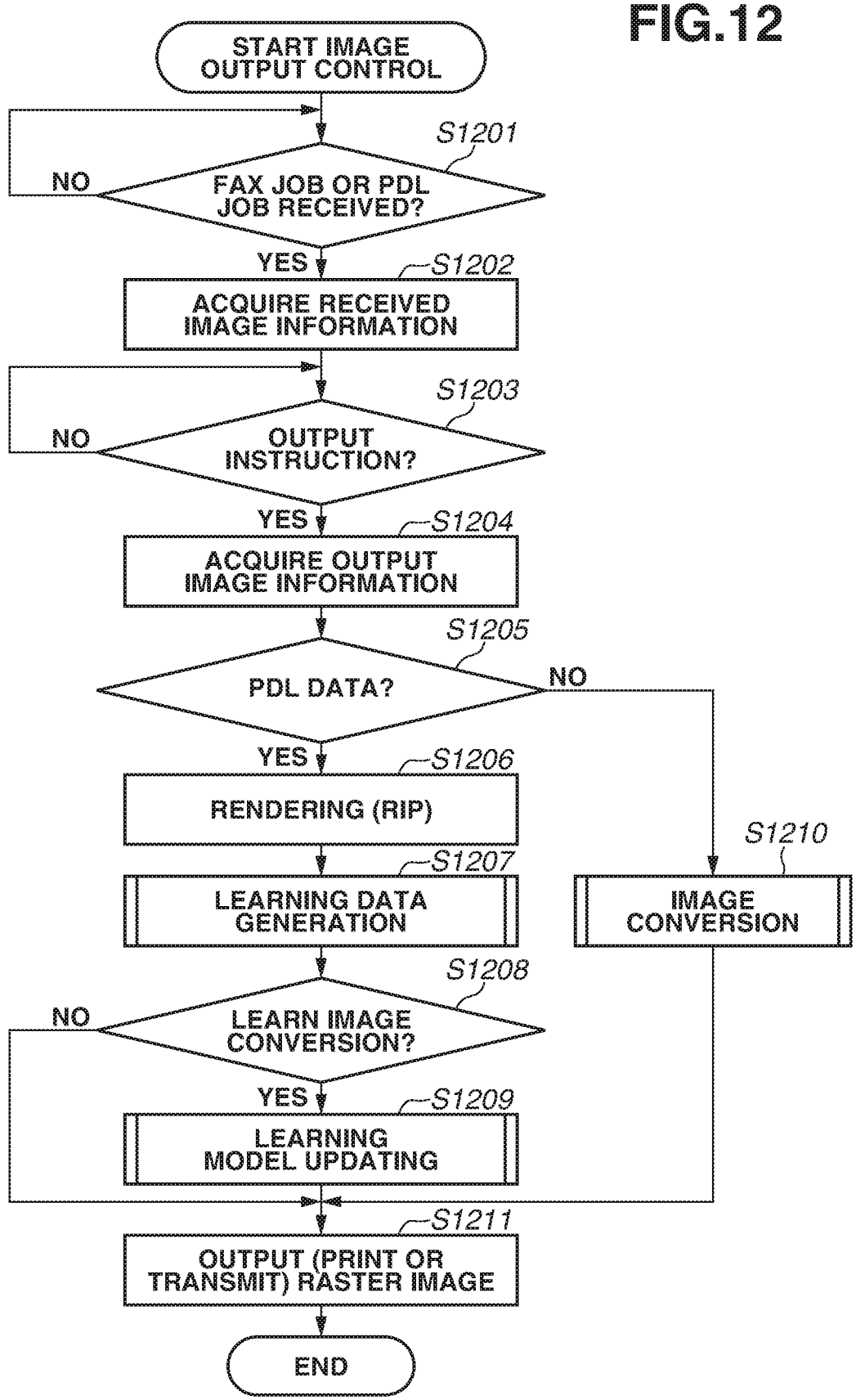
FIG. 12 is a flowchart illustrating image output control in the second exemplary embodiment.

FIG. 12 is a flowchart illustrating the flow of image output processing which is performed by the image processing apparatus 101. Furthermore, the steps illustrated in FIG. 12 are stored in, for example, the ROM 202, the RAM 204, or the storage 208 of the image processing apparatus 101 and are performed by the CPU 201 of the image processing apparatus 101. Furthermore, a configuration in which some of the steps illustrated in FIG. 12 are stored in, for example, the ROM 232, the RAM 234, or the storage 235 of the image processing server 103 and are performed by the CPU 231 of the image processing server 103 based on a request from the CPU 201 can be employed.

As illustrated in FIG. 12, in step S1201, the CPU 201 determines whether a PDL job or a FAX job has been received in the image processing apparatus 101. If it is determined that a job issued from the user has been received (YES in step S1201), the CPU 201 advances the processing to step S1202, and, if it is determined that any job issued from the user has not been received (NO in step S1201), the CPU 201 returns the processing to step S1201, thus waiting until a job is received. Next, in step S1202, the CPU 201 acquires attribute information such as a resolution, a gradation (for example, 1 bit=binary or 8 bits=256 gradation levels), and the number of channels (for example, monochromatic=1 channel or color=3 channels) included in the received image based on document data included in the job received in step S1201. Here, if the received image is PDL data, since it is possible to generate optional raster-format image data, the CPU 201 acquires resolution information which is assumed to indicate an available maximum resolution (for example, 1200×1200 dpi). Moreover, if the received image is FAX data, since image conversion on the received low-resolution image data is performed, the CPU 201 acquire resolution information (for example, 200×200 dpi) included in control information of the FAX data. Next, in step S1203, the CPU 201 determines whether an output instruction issued by the user has been received via the input device 209. If it is determined that an output instruction issued by the user has been received (YES in step S1203), the CPU 201 advances the processing to step S1204, and, if it is determined that any output instruction issued by the user has not been received (NO in step S1203), the CPU 201 returns the processing to step S1203, thus waiting for reception of the output instruction. Next, in step S1204, the CPU 201 acquires attribute information, such as an output resolution, a gradation (for example, 1-bit gradation or 8-bit gradation), and the number of channels (for example, monochromatic=1 channel or color=3 channels), which is based on the output instruction received in step S1203 or the function specification designated with the output instruction. Here, for example, when the output instruction is print outputting using the printer device 205, the CPU 201 acquires an output resolution (for example, 1200×1200 dpi) designated by the user with the output instruction. Alternatively, the CPU 201 acquires an output resolution (for example, 600×600 dpi) specified for a printer engine. Moreover, for example, when the output instruction is transmission outputting using the external interface 211, the CPU 201 acquires an output resolution (for example, 600×600 dpi) designated by the user with the output instruction or an output resolution (for example, 300×300 dpi) for the transmission file standard specification. Here, if an explicit destination of an output resolution is performed by the user, the CPU 201 can acquire the designated output resolution, and, if no explicit destination is performed by the user, the CPU 201 can acquire an output resolution previously determined as the specification. Furthermore, an explicit output resolution designated by the user can be a resolution which is able to be changed according to the use application of image data targeted for an output instruction. Accordingly, the user can indirectly designate the output resolution by selecting any one of image-quality priority (high quality, low speed, and large file size) and speed priority (low quality, high speed, and small file size). Next, in step S1205, the CPU 201 determines whether document data included in the job received in step S1201 is PDL data or FAX data. If it is determined that PDL data has been acquired (YES in step S1205), the CPU 201 advances the processing to step S1206, and, if it is determined that FAX data has been acquired (NO in step S1205), the CPU 201 advances the processing to step S1210. Next, in step S1206, the CPU 201 interprets vector-format image data such as PDL to convert the vector-format image data into a display list and then performs rendering (RIP) on the display list, thus generating raster-format image data. Next, in step S1207, the CPU 201 generates learning data used for a learning model to perform learning with use of PDL data in addition to the main function of performing job processing. Such a learning model functions as an image conversion unit which converts low-resolution image data into high-resolution image data.

Furthermore, the flow of processing in step S1207 is as described above with reference to the flowchart of FIG. 11.

Next, in step S1208, the CPU 201 determines whether to cause a learning model to perform learning with use of the learning data generated in step S1207. If it is determined to cause a learning model to perform learning (YES in step S1208), the CPU 201 advances the processing to step S1209, and, if it is determined not to cause a learning model to perform learning (NO in step S1208), the CPU 201 advances the processing to step S1211. Next, in step S1209, the CPU 201 performs control in such a way as to perform computation processing to cause a learning model to perform learning with use of the learning data generated in step S1207. Furthermore, the flow of processing in step S1209 is as described above with reference to the flowchart of FIG. 6. On the other hand, if it is determined that FAX data has been acquired (NO in step S1205), then in step S1210, the CPU 201 performs control in such a way as to perform image conversion using a learning model. Thus, the CPU 201 performs control in such a way as to perform image conversion for converting low-resolution image data into high-resolution image data. Furthermore, the flow of processing in step S1210 is as described above with reference to the flowchart of FIG. 7. Finally, in step S1211, the CPU 201 performs printing or transmission according to the output form designated with the output instruction received in step S1203 with use of raster-format image data generated in any one of step S1206 and step S1210. Thus, the CPU 201 performs control in such a way as to output a post-RIP image generated by rendering in step S1206 in the case of a PDL job and output a post-conversion image generated by image conversion in step S1210 in the case of a FAX job.

Figure 14A:
FIGS. 14A, 14B, 14C, 14D, 14E, and 14F are diagrams used to explain image deterioration of an input image.
Figure 14B:
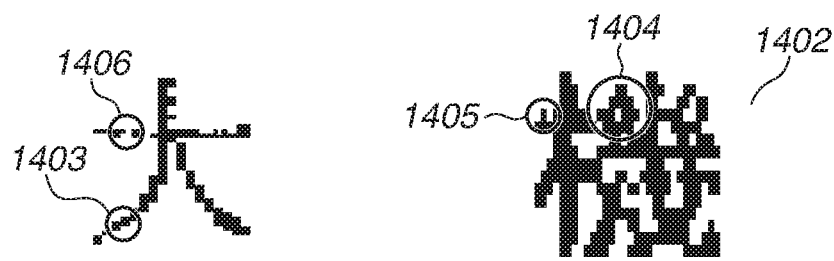

FIGS. 14A, 14B, 14C, 14D, 14E, and 14F are diagrams illustrating features of image deterioration in FAX data. FIG. 14A illustrates an example of high-quality image data 1401 obtained before being FAX-transmitted, and FIG. 14B illustrates an example of low-quality image data 1402 obtained after being FAX-received. In the following description, a region in which there is no print is referred to as a background region, and a drawing object, such as a character or ruled lines, printed on the background region is referred to as a foreground object.

Figure 14C:
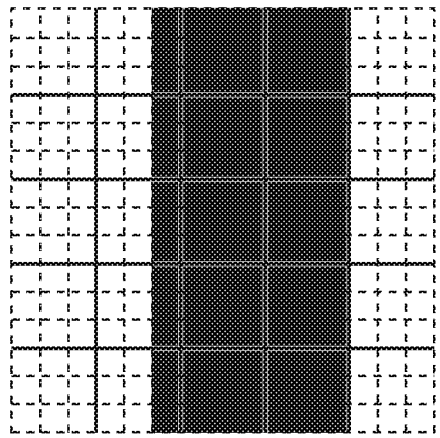
Figure 14D:
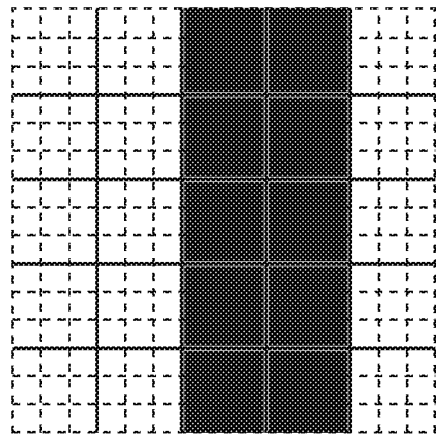
Figure 14E:
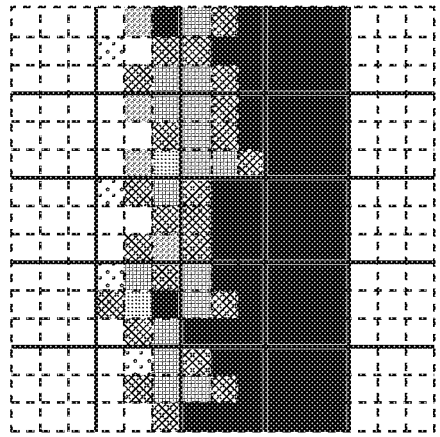
Figure 14F:
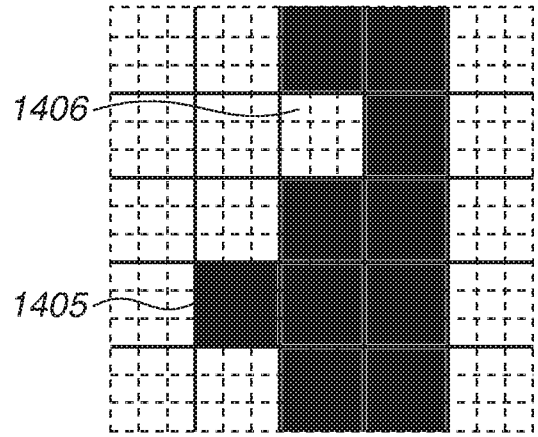

As illustrated in FIG. 14B, the high-quality image data 1401 is converted into low-resolution image data (for example, 200×100 dpi). This causes the occurrence of unevenness of an edge shape of the foreground object such as that indicated in an image position 1403 (hereinafter referred to as zigzags) or crushes of the foreground object such as that indicated in an image position 1404 (hereinafter referred to as crushes). Additionally, there occur convex- and concave-shaped noises and losses indicated in an image position 1405 and an image position 1406 specific to FAX transmission (hereinafter collectively referred to as convex and concave noises) such as those which do not exist in the high-quality image data 1401. The convex and concave noises are formed by halftone pixels generated around the foreground object during binarization processing being emphasized. Furthermore, halftone pixels generated around the foreground object are pixels generated by a complex combination of the following factors. For example, the factors include, in a printed original to be used for FAX transmission, splattering of toner or unevenness of the amount of application of toner occurring during printing. Moreover, the factors include, for example, during scanning of such an original, blurring of an edge caused by a reading resolution and variation of sensor values obtained by a reading sensor. Moreover, the factors include, for example, defocusing of a reading sensor caused by slight strain of an original, fluctuation of pixel values caused by variation of illuminating light, and reading of a paper texture pattern or background color of an original itself. Additionally, the factors include, for example, pixel value interpolation performed during, for example, resolution conversion. FIG. 14C is an enlarged view of an edge portion of the foreground object in a high-resolution image. Dashed lines indicate one pixel in 600×600 dpi, and heavy lines indicate one pixel in 200×200 dpi. FIG. 14D is a diagram obtained by converting the image illustrated in FIG. 14C into an image with 200×200 dpi. On the other hand, FIG. 14E is an example of an enlarged view of an edge portion of the foreground object in an image obtained by scanning an original. As illustrated in FIG. 14E, due to the above-mentioned factors, variations of pixel values are occurring at a boundary portion of the foreground object. FIG. 14F is a diagram obtained by converting the image illustrated in FIG. 14E into an image with 200×200 dpi. A convex noise at the image position 1405 is a black pixel formed on the outside based on an edge of the original foreground object illustrated in FIG. 14D. On the other hand, a concave noise at the image position 1406 is a white pixel formed on the inside based on an edge of the original foreground object, and a portion at which concave noises close up becomes a loss in the foreground object.

FIGS. 13A, 13B, 13C, 13D, and 13E are diagrams illustrating image samples which are specific examples of a first image serving as a correct answer image and a second image serving as an input image. FIG. 13A illustrates an image generated with a resolution of 1200×1200 dpi as a correct answer image. FIG. 13B illustrates an image generated with a resolution of 600×600 dpi as a correct answer image. FIG. 13C illustrates an image generated with a resolution of 200×200 dpi as an input image. FIG. 13D illustrates an image generated with a resolution of 200×100 dpi as an input image. FIG. 13E illustrates an image generated with a resolution of 200×100 dpi as an input image without imparting noise in step S1501 described below.

As illustrated in FIGS. 13A and 13B, since, with regard to a first image serving as a correct answer image, as the resolution is higher, the edge shape is able to be expressed more smoothly, a more high-quality image conversion result is able to be obtained, for example, by performing learning with the image illustrated in FIG. 13A used as a correct answer image than by performing learning with the image illustrated in FIG. 13B used as a correct answer image. Moreover, as illustrated in FIGS. 13A and 13B, with regard to a first image serving as a correct answer image, setting a sufficient resolution with respect to an output resolution used for image outputting performed by the user, such as a print engine resolution, enables providing a high-quality output image to the user.

As illustrated in FIGS. 13C and 13D, since, with regard to a second image serving as an input image, as the resolution is lower, the number of steps occurring in the edge shape becomes larger, a more high-quality image conversion result is able to be obtained, for example, by performing learning with the images illustrated in FIGS. 13C and 13D used as respective different input images.

For example, learning data is generated with a pair of the image illustrated in FIG. 13C serving as an input image and the image illustrated in FIG. 13A serving as a correct answer image and a learning model is caused to perform learning with use of the generated learning data. Such a learning model corresponds to a learning model C illustrated in FIG. 17A. Moreover, as a different data form, for example, learning data is generated with a pair of the image illustrated in FIG. 13D serving as an input image and the image illustrated in FIG. 13A serving as a correct answer image and a learning model is caused to perform learning with use of the generated learning data. Such a learning model corresponds to a learning model D illustrated in FIG. 17A.

While FIG. 13C illustrates an example in which an image is expressed with a resolution of, for example, 200×200 dpi, in which the number of horizontal dots per inch is equal to the number of vertical dots per inch, FIG. 13D illustrates an example in which an image is expressed with a resolution of, for example, 200×100 dpi, in which the number of horizontal dots per inch is different from the number of vertical dots per inch. Herein, an input image such as that illustrated in FIG. 13D, in which the number of horizontal dots per inch is different from the number of vertical dots per inch, contains convex noises characterized by taking on a long tapered shape. For example, performing image conversion using a learning model which has learned to detect and remove such noises enables efficiently obtaining a high-quality image conversion result. Furthermore, since an image illustrated in FIG. 13E is obtained by performing conversion into low resolution and binarization processing without performing noise impartation processing described below, there occur no convex and concave noises specific to FAX images described above. Therefore, even if such input data is used as learning data for use in learning, it is difficult to generate a high-accuracy learning model. Accordingly, learning data with a correct answer image illustrated in is to be generated, for example, FIG. 13A or FIG. 13B and an input image illustrated in, for example, FIG. 13C or FIG. 13D and containing noises specific to FAX images paired up and associated with each other.

FIGS. 15A, 15B, 15C, 15D, 15E, 15F, and 15G are diagrams used to explain a method of generating a low-quality FAX received image in a pseudo manner by performing FAX image processing simulation (low-image-quality conversion processing) based on a high-quality correct answer image. FIG. 15A is a flowchart illustrating an example of processing for generating a low-quality FAX image in the present exemplary embodiment, and FIGS. 15B to 15G are diagrams illustrating examples of images generated in the respective processing steps.

In step S1501, the CPU 201 imparts, to the correct answer image (multivalued data) generated in step S1103 illustrated in FIG. 11, such noises (random noises) as to reproduce halftone pixels to be generated around the above-mentioned foreground object. More specifically, the CPU 201 imparts a full-plane noise image illustrated in FIG. 15C to high-quality image data illustrated in FIG. 15B, thus generating a noise-imparted image illustrated in FIG. 15D. Herein, the CPU 201 generates signed noises (hereinafter referred to as "Gaussian noises") in a normal distribution defined by an average value $\mu$ and a standard deviation 6 (for example, $\mu=0$ and $\sigma=75$) and adds the signed noises to pixel values in high-quality image data, thus generating a noise image. Furthermore, the type of noises to be generated and the method of imparting such noises are not limited to these. For example, the standard deviation or the average value to be used can be other values. Moreover, noises in a uniform distribution can be generated, or pixels in high-quality image data can be replaced by generated noise values.

Next, in step S1502, the CPU 201 performs reduction processing on the generated noise imparted image to convert such an image into an image with a designated resolution (for example, 200×100 dpi). While a pixel interpolation method for use in the reduction processing can be any processing method, herein, the CPU 201 performs interpolation processing using a bicubic interpolation method to generate a reduced image illustrated in FIG. 15E. Here, for ease of explanation, an image simply enlarged to a size of 600×600 dpi is illustrated.

Moreover, in step S1503, the CPU 201 performs binarization processing (two-valued conversion processing) on the generated reduced image. While a threshold value for use in the binarization processing can be a predetermined value, herein, the CPU 201 uses a discriminatory analysis method for obtaining an optimum threshold value from a distribution of pixel values in the entire image, thus generating a binarized image (binary data) illustrated in FIG. 15F. This enables reproducing crushes 1510, zigzags 1511, and convex and concave noises 1512 of the foreground object (foreground region), which are image deteriorations specific to a FAX image. Furthermore, in a case where the noise value to be imparted in step S1501 is large or the binarization threshold value to be used in step S1503 is not appropriate, salt-and-pepper noises 1513 may occur in the binarized image as illustrated in FIG. 15G. Therefore, performing processing for isolated point removal to remove such noises enables performing correction to obtain an image such as that illustrated in FIG. 15F.

As described above, according to the second exemplary embodiment of the disclosure, learning data is generated by performing FAX image processing simulation based on a PDL job received by the image processing apparatus, so that it is possible to update a learning model in an optimized manner using data specific to the user. In other words, at the time of job processing of PDL data received in vector form, learning data generation and learning model updating for FAX image conversion are previously performed, so that, at the time of job processing of FAX data received in low-resolution raster form, it is possible to implement image conversion using a learned model. This enables generating a high-quality output image even with respect to FAX data which varies for user environments. Furthermore, while, in FIG. 17A, an example in which respective learning models are generated for every combination of a reception resolution and an output resolution has been described, a plurality of combinations of a reception resolution and an output resolution can be shared by one learning model. For example, as illustrated in FIG. 17B, with regard to output resolutions (1200×1200 dpi, 600×600 dpi, and 400×400 dpi) directed to an improvement in resolutions with respect to the reception solution of 400×400 dpi, a shared learning model A can be used. On this occasion, the learning model A have learned with an output resolution of 1200×1200 dpi, which is the highest resolution. Then, in a case where another output resolution is requested, the learning model A can be used with, for example, low-resolution conversion processing applied to an image of 1200×1200 dpi converted based on the learning model A. Similarly, with regard to output resolutions directed to an improvement in resolutions with respect to the other reception solutions, respective shared learning models (B, C, and D) can also be used. Moreover, as illustrated in FIG. 17B, learning models used for performing conversion directed to a decrease in resolution (E, F, G, and H) can also be generated. However, since conversion directed to a decrease in resolution does not have much use application, the learning models (E, F, G, and H) do not need to be generated. Then, in a case where an instruction directed to a decrease in resolution has been issued, resolution conversion can be performed for output processing without the use of a learning model. Furthermore, in the case of performing automatic learning, even if the same data is used for base, there may occur a difference between a past conversion result and a future conversion result. Accordingly, it is desirable to be able to meet the demand of a user who does not want such a difference in conversion result any more. Therefore, as illustrated in FIG. 20B, an ON button and an OFF button be provided in a setting screen for automatic learning 2002 and switching to a setting for not performing automatic learning (OFF) be possible. Furthermore, the setting screen for automatic learning 2002 can be called up by selecting the detail screen button 832 of the output setting screen 831 and then selecting an item for automatic learning from a detail setting screen (not illustrated).

A third exemplary embodiment is configured to perform control in such a way as to switch and impart Gaussian noises, which, in the above-described second exemplary embodiment, are imparted in a uniform manner, according to regions.

This control is performed to reproduce, in a pseudo manner, the behavior of appearance of convex and concave noises specific to a FAX image, which differs according to device characteristics of an image processing apparatus 101 which performs FAX transmission and reception. For example, there are an original in which there are many convex noises and a foreground object is likely to crush, an original in which there are many concave noises and a foreground is likely to suffer a loss, and so on. To convert FAX images having such respective different features into high-quality images, a learning model is to be performed learning with use of learning data including low-quality image data obtained by reproducing such respective features. Furthermore, except for the above-described characterizing portion and its related portion, a configuration of the image processing system in the third exemplary embodiment is similar to that of the image processing system in the second exemplary embodiment. Therefore, similar constituent elements are assigned the respective same reference characters and the detailed description thereof is omitted here.

FIGS. 16A, 16B, 16C, 16D, 16E, 16F, 16G, 16H, 16I, and 16J are diagrams illustrating the method of generating a low-quality FAX received image in a pseudo manner by performing FAX image processing simulation based on a high-quality correct answer image in the third exemplary embodiment. FIG. 16A is a flowchart illustrating an example of processing for generating a low-quality FAX image in the present exemplary embodiment, and FIGS. 16B to 16J are diagrams illustrating examples of images generated in the respective processing steps. Furthermore, processing operations which are common to those in the second exemplary embodiment are omitted from description, and only differences therefrom are described.

In step S1601, the CPU 201 detects a noise imparting target region with respect to high-quality image data. Herein, the CPU 201 detects a surrounding region and an inside region of a foreground object from high-quality image data illustrated in FIG. 16B. A surrounding region of the foreground object illustrated in FIG. 16D is able to be detected by performing expansion processing for thickening, by a predetermined width, black pixels corresponding to a character and a ruled line serving as the foreground object as illustrated in FIG. 16C and obtaining a difference between the expanded image and the pre-expansion image illustrated in FIG. 16B. On the other hand, a surrounding region of the foreground object illustrated in FIG. 16H is able to be detected by performing contraction processing for thinning, by a predetermined width, black pixels corresponding to a character and a ruled line serving as the foreground object as illustrated in FIG. 16G and obtaining a difference between the contracted image and the pre-contraction image illustrated in FIG. 16B.

Next, in step S1602, the CPU 201 generates a noise imparted image with respect to the surrounding region of the foreground object and the inside region of the foreground object. More specifically, the CPU 201 obtains a logical product between a full-plane noise image generated in a method similar to that in step S1501 illustrated in FIG. 15A and the surrounding region and the inside region detected in step S1601, thus generating Gaussian noises to be imparted to the surrounding region of the foreground object and the inside region of the foreground object. Then, the CPU 201 can generate a noise imparted image in a way similar to that in step S1501. Furthermore, the full-plane noise image can be generated independently with respect to the surrounding region and the inside region, and noises can be imparted to only one of the surrounding region and the inside region. FIG. 16E and FIG. 16I are enlarged views of a portion 1611 of high-quality image data. For example, as illustrated in FIG. 16E, noises can be imparted to only the surrounding region of the foreground object, and, as illustrated in FIG. 16I, noises can be imparted to only the inside region of the foreground object.

In step S1603 and step S1604, the CPU 201 performs resolution conversion processing and binarization processing, respectively, in a way similar to that in the second exemplary embodiment, thus generating low-quality image data. FIG. 16F illustrates an example of a result obtained by processing the image illustrated in FIG. 16E in which noises are imparted to the surrounding region of the foreground object. Imparting noises to the surrounding region of the foreground object in this way enables performing control such that a convex noise becomes likely to occur. On the other hand, FIG. 16J illustrates an example of a result obtained by processing the image illustrated in FIG. 16I in which noises are imparted to the inside region of the foreground object. Imparting noises to the inside region of the foreground object in this way enables performing control such that a concave noise becomes likely to occur.

Then, the CPU 201 causes a learning model to perform learning using, as input images, images subjected to noise imparting operations differing in characteristics, thus being able to prepare learning models differing in image conversion result. For example, as illustrated in FIG. 17C, there are learning models for 1200×1200 dpi (mixed) (A, B, C, and D) and learning models for 600×600 dpi (mixed) (E, F, G, and H). These learning models are learning models which have performed learning using learning data in which an image with a concave noise imparted thereto and an image with a convex noise imparted thereto are used as input images. These learning models are able to remove a concave noise and a convex noise in a well-balanced manner.

Learning models for 1200×1200 dpi (concave noise) (I, J, K, and L) and learning models for 600×600 dpi (concave noise) (M, N, 0, and P) are learning models which have performed learning using learning data in which an image with a concave noise imparted thereto is used as an input image. These learning models are able to efficiently remove a concave noise. Therefore, these learning models are able to obtain a converted image in which an image constituting a line is securely filled.

Learning models for 1200×1200 dpi (convex noise) (Q, R, S, and T) and learning models for 600×600 dpi (convex noise) (U, V, W, and X) are learning models which have performed learning using learning data in which an image with a convex noise imparted thereto is used as an input image. These learning models are able to efficiently remove a convex noise. Therefore, these learning models are able to obtain a converted image in which a space between lines is securely left.

As mentioned above, learning models having respective different tendencies is to be selectively used according to the designation performed by the user. FIG. 21A is a diagram illustrating a setting screen for correction tendency 2101.

The setting screen for correction tendency 2101 contains a "line priority button", a "recommendation button", and an "interline space priority button", one of which is able to be designated by the user. The "recommendation button" is a button operated to use the learning models (A, B, C, and D) and the learning models (E, F, G, and H). The "line priority button" is a button operated to use the learning models (I, J, K, and L) and the learning models (M, N, 0, and P). The "interline space priority button" is a button operated to use the learning models (Q, R, S, and T) and the learning models (U, V, W, and X). Furthermore, the setting screen for correction tendency 2101 can be called up by selecting a detail screen button 832 of the output setting screen 831 and then selecting an item for correction tendency from a detail setting screen (not illustrated).

As described above, according to the third exemplary embodiment, performing processing in which a region to which to impart Gaussian noise is independently set to a surrounding region and an inside region of a foreground object enables generating an image in which image deterioration specific to a FAX image has been reproduced. This enables generating, for example, a learning model robust over a convex noise and a learning model robust over a concave noise according to a manner of image deterioration of a FAX image which is received.

While, in the above-described exemplary embodiments, the timing of image conversion processing to be performed on a received image is set to timing after an output instruction issued by the user, in a fourth exemplary embodiment, the timing of image conversion processing to be performed on a received image is set to timing before an output instruction issued by the user. Furthermore, except for the above-described characterizing portion and its related portion, a configuration of the image processing system in the fourth exemplary embodiment is similar to that of the image processing system in the first exemplary embodiment. Therefore, similar constituent elements are assigned the respective same reference characters and the detailed description thereof is omitted here.

Figure 18:
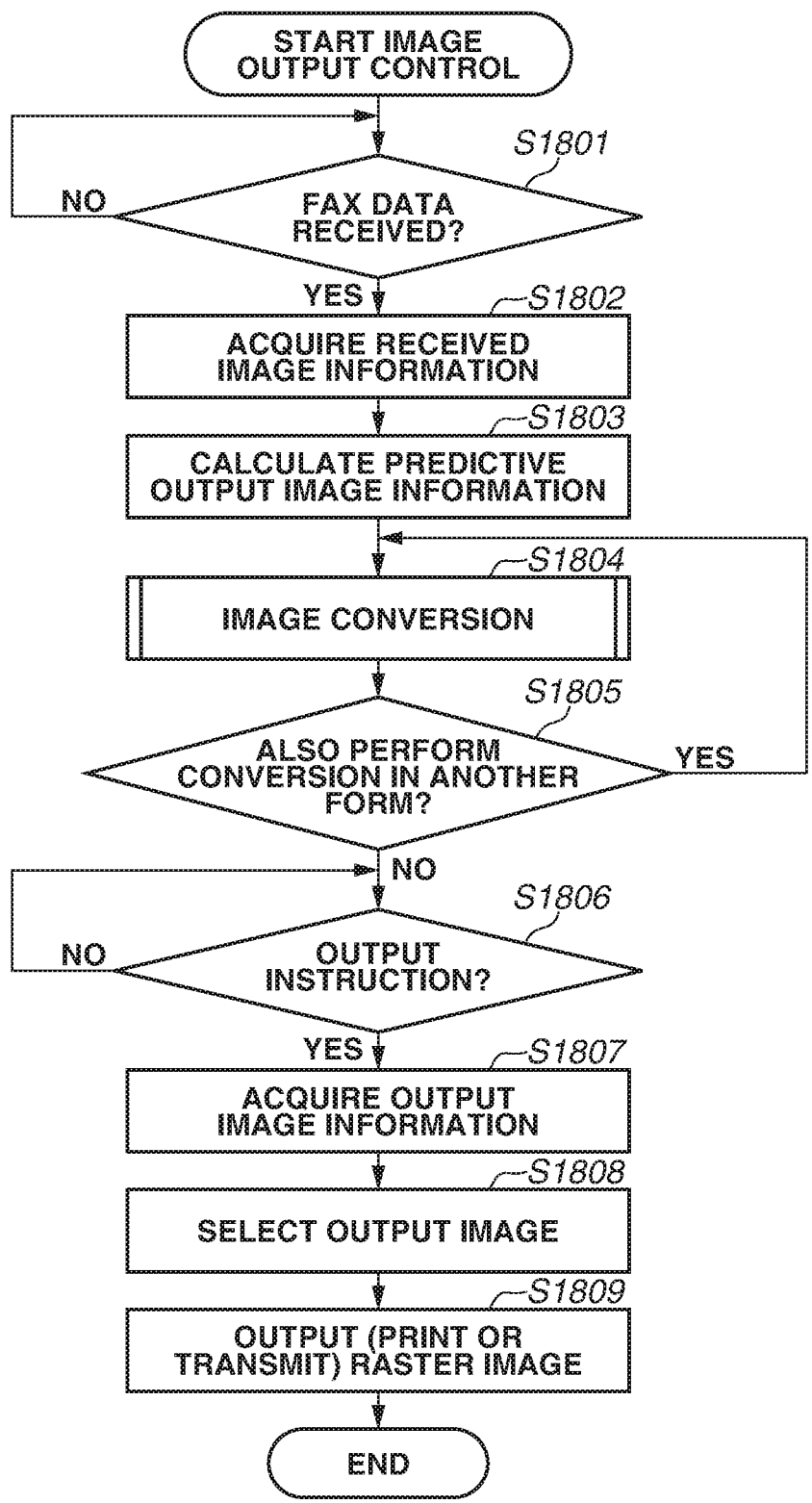
FIG. 18 is a flowchart illustrating image output control in a fourth exemplary embodiment.

FIG. 18 is a flowchart illustrating the flow of image output processing which is performed by the image processing apparatus 101 in the fourth exemplary embodiment. Furthermore, the steps illustrated in FIG. 18 are stored in, for example, the ROM 202, the RAM 204, or the storage 208 of the image processing apparatus 101 and are performed by the CPU 201 of the image processing apparatus 101. Furthermore, a configuration in which some of the steps illustrated in FIG. 18 are stored in, for example, the ROM 232, the RAM 234, or the storage 235 of the image processing server 103 and are performed by the CPU 231 of the image processing server 103 based on a request from the CPU 201 can be employed. Furthermore, since the flow illustrated in FIG. 18 includes portions common to those illustrated in FIG. 5 in the first exemplary embodiment, the description of such common portions is omitted and only differences thereof are described.

Steps S1801 and S1802 illustrated in FIG. 18 are similar to steps S501 and S502 illustrated in FIG. 5, and are, therefore, omitted from description. Moreover, processing concerning automatic processing (steps S503 and S504) has little relevance to the characterizing portions of the present exemplary embodiment, and is, therefore, omitted from description. In the fourth exemplary embodiment, image conversion before an output instruction is issued by the user is performed. However, at this point, it is unclear what output resolution the user will designate. Therefore, in step S1803, the CPU 201 determines a predictive output resolution, and, in step S1804, the CPU 201 performs image conversion processing described with reference to FIG. 7 with the determined predictive output resolution used for step S702. Furthermore, examples of the predictive output resolution include a default value preset in the main body at the time of product delivery and a setting value previously designated by the user. Moreover, the predictive output resolution can be not a single value but a plurality of values. For example, as illustrated in FIG. 21B, the user is allowed to call up a setting screen for precedent image conversion function (the function of performing image conversion before an output instruction) 2102. In the setting screen for precedent image conversion function 2102, whether to use a precedent image conversion function is able to be switched with an ON button and an OFF button. Moreover, in the setting screen for precedent image conversion function 2102, in the case of a setting (ON) to use the precedent image conversion function, the user is allowed to designate the value of the predictive output resolution. FIG. 21B illustrates a condition in which 1200×1200 dpi, 600×600 dpi, and 300×300 dpi have been selected as the predictive output resolution. Furthermore, here, all of the output resolutions which are able to be designated can be set as the predictive output resolution. The setting screen 2102 can be called up by selecting a detail screen button 832 of the output setting screen 831 and then selecting an item for predictive image conversion from a detail setting screen (not illustrated). Then, in a case where a plurality of predictive output resolutions has been designated, the CPU 201 determines to also perform conversion in another form until all of the image conversion results corresponding to the designated plurality of predictive output resolutions are obtained (YES in step S1805), thus repeatedly performing image conversion processing. If all of the image conversion operations have been completed (NO in step S1805), the CPU 201 waits (NO in step S1806) until an output instruction is issued by the user (YES in step S1806). Then, in step S1807, the CPU 201 acquires output image information based on the contents of the output instruction, and, in step S1808, the CPU 201 selects a post-conversion image (output image) corresponding to the output image information. Then, in step S1809, the CPU 201 performs outputting (printing or transmission) of the selected image.

Figure 19:
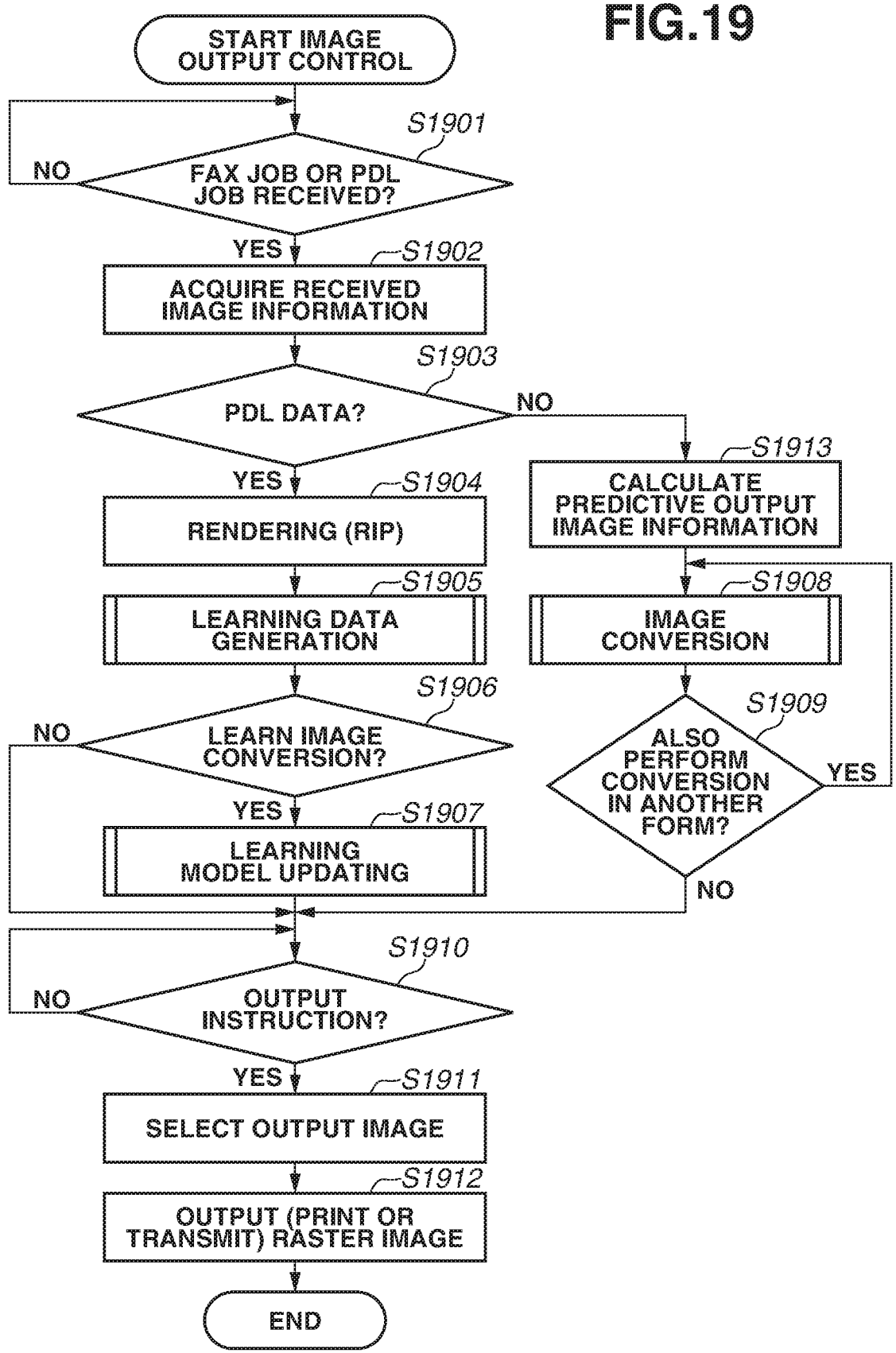
FIG. 19 is a flowchart illustrating image output control in the fourth exemplary embodiment.

FIG. 19 is a flowchart illustrating the flow of image output processing which is performed by the image processing apparatus 101 in the fourth exemplary embodiment. Furthermore, the steps illustrated in FIG. 19 are stored in, for example, the ROM 202, the RAM 204, or the storage 208 of the image processing apparatus 101 and are performed by the CPU 201 of the image processing apparatus 101. Furthermore, a configuration in which some of the steps illustrated in FIG. 18 are stored in, for example, the ROM 232, the RAM 234, or the storage 235 of the image processing server 103 and are performed by the CPU 231 of the image processing server 103 based on a request from the CPU 201 can be employed. Furthermore, since the flow illustrated in FIG. 19 includes portions common to those illustrated in FIG. 12 in the second exemplary embodiment, the description of such common portions is omitted and only differences thereof are described.

Steps S1901 and S1902 illustrated in FIG. 19 are similar to steps S1201 and S1202 illustrated in FIG. 12, and are, therefore, omitted from description. Moreover, steps S1903 to S1907 illustrated in FIG. 19 are similar to steps S1205 to S1209 illustrated in FIG. 12, and are, therefore, omitted from description. If, in step S1903, it is determined that document data included in the job received in step S1901 is not PDL data (NO in step S1903), the CPU 201 advances the processing to step S1913.

Then, in step S1913, the CPU 201 determines a predictive output resolution, and, in step S1908, the CPU 201 performs image conversion processing described with reference to FIG. 7 with the determined predictive output resolution used for step S702. Then, in a case where a plurality of predictive output resolutions has been designated, the CPU 201 determines to also perform conversion in another form until all of the image conversion results corresponding to the designated plurality of predictive output resolutions are obtained (YES in step S1909), thus repeatedly performing image conversion processing. If all of the image conversion operations have been completed (NO in step S1909), the CPU 201 advances the processing to step S1910. Steps S1910 and S1911 illustrated in FIG. 19 are similar to steps S1203 and S1204 illustrated in FIG. 12, and are, therefore, omitted from description. Finally, in step S1912, as with step S1211, the CPU 201 selects raster-format image data coincident with the output form designated with the output instruction received in step S1910 and then performs printing or transmission of the selected raster-format image data. Thus, in the case of a PDL job, the CPU 201 performs control in such a way as to output a post-RIP image generated by rendering in step S1904. In the case of a FAX job, the CPU 201 performs control in such a way as to output a post-conversion image coincident with the output form designated with the output instruction out of post-conversion images generated by image conversion in step S1908.

As described above, according to the fourth exemplary embodiment, previously generating an image conversion result based on image data received in low resolution before an output instruction enables reducing a waiting time required after the output instruction.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

The aspect of the embodiments can be applied to a system composed of a plurality of devices or can be applied to an apparatus composed of a single device. For example, in the second exemplary embodiment, the learning data generation unit 122 and the learning unit 112 are configured to be implemented in the learning apparatus 102, but can be configured to be implemented in the respective separate apparatuses. In this case, the apparatus in which the learning data generation unit 122 is implemented transmits learning data generated by the learning data generation unit 122 to the apparatus in which the learning unit 112 is implemented. Then, the learning unit 112 learns a neural network based on the received learning data. Moreover, while an example in which the image processing apparatus 101 and the image processing server 103 are respective separate apparatuses has been described, the image processing apparatus 101 and the image processing server 103 can be integrated into a single apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-036854 filed Feb. 28, 2019, which is hereby incorporated by reference herein in its entirety.

What is claimed is:

1. A system comprising:
at least one memory that stores a program; and
at least one processor that executes the program to perform:
acquiring first information about a first resolution of an input image;
acquiring second information about a second resolution of an image that is to be output, wherein the second resolution is higher than the first resolution;
determining, from among a plurality of neural networks that convert a low-resolution image into a high-resolution image, one neural network based on the first information and the second information, wherein the determined one neural network is a neural network suitable for converting an image having the first resolution into an image having the second resolution,
wherein the plurality of neural networks are obtained by performing learning based on an image data pair which includes first image data and second image data which is higher in resolution than the first image data,
wherein the second image data is obtained by rendering page-description language (PDL) data included in a print job, and
wherein the first image data is obtained at least by imparting noises to the obtained second image data and converting the noises-imparted second image data into an image of a low-resolution;

acquiring post-conversion image data having the second resolution into which the input image having the first resolution is converted using the determined one neural network; and outputting the acquired post-conversion image data.

2. The system according to claim 1, wherein the first image data is binary data and the second image data is multivalued data.

3. The system according to claim 1, further comprising a printer, wherein the outputting includes causing the printer to form the acquired post-conversion image data on a sheet, and wherein the second information is information about the second resolution at which image formation is performed by the printer.

4. The system according to claim 1, further comprising a user interface configured to receive an operation performed by a user, wherein the second information is information about the second resolution designated by the user via the user interface.

5. The system according to claim 1, wherein the noise imparting processing includes processing for imparting random noise to the obtained second image data.

6. The system according to claim 1, wherein the first image data is obtained by imparting noises to the obtained second image data, converting the noises-imparted second image data into an image of a low-resolution and further applying binarization processing to the converted image of the low-resolution.

7. The system according to claim 1, wherein the noise imparting processing includes processing for imparting respective independent random noises to a surrounding region of a foreground region of the obtained second image data and an inside region of the foreground region of obtained the second image data.

8. A method comprising:

acquiring first information about a first resolution of an input image;

acquiring second information about a second resolution of an image that is to be output, wherein the second resolution is higher than the first resolution;

determining, from among a plurality of neural networks that convert a low-resolution image into a high-resolution image, one neural network based on the first information and the second information, wherein the determined one neural network is a neural network suitable for converting an image having the first resolution into an image having the second resolution, wherein the plurality of neural networks are obtained by performing learning based on an image data pair which includes first image data and second image data which is higher in resolution than the first image data, wherein the second image data is obtained by rendering page-description language (PDL) data included in a print job, and wherein the first image data is obtained at least by imparting noises to the obtained second image data and converting the noises-imparted second image data into an image of a low-resolution;

acquiring post-conversion image data having the second resolution into which the input image having the first resolution is converted using the determined one neural network; and outputting the acquired post-conversion image data.

9. The method according to claim 8, wherein the outputting includes causing a printer to form the acquired post-conversion image data on a sheet, and wherein the second information is information about the second resolution at which image formation is performed by the printer.

10. The method according to claim 8, further comprising receiving an operation performed by a user by a user interface, wherein the second information is information about the second resolution designated by the user via the user interface.

11. A non-transitory computer-readable storage medium storing computer-executable instructions that, when executed by a computer, cause the computer to perform a method comprising:

acquiring first information about a first resolution of an input image;

acquiring second information about a second resolution of an image that is to be output, wherein the second resolution is higher than the first resolution;

determining, from among a plurality of neural networks that convert a low-resolution image into a high-resolution image, one neural network based on the first information and the second information, wherein the determined one neural network is a neural network suitable for converting an image having the first resolution into an image having the second resolution, wherein the plurality of neural networks is obtained by performing learning based on an image data pair which includes first image data and second image data which is higher in resolution than the first image data, wherein the second image data is obtained by rendering page-description language (PDL) data included in a print job, and wherein the first image data is obtained at least by imparting noises to the obtained second image data and converting the noises-imparted second image data into an image of a low-resolution;

acquiring post-conversion image data having the second resolution into which the input image having the first resolution is converted using the determined one neural network; and outputting the acquired post-conversion image data.

12. The non-transitory computer-readable storage medium according to claim 11, wherein the outputting includes causing a printer to form the acquired post-conversion image data on a sheet, and wherein the second information is information about the second resolution at which image formation is performed by the printer.

13. The non-transitory computer-readable storage medium according to claim 11, further comprising receiving an operation performed by a user by a user interface, wherein the second information is information about the second resolution designated by the user via the user interface.

14. A non-transitory computer-readable storage medium storing computer-executable instructions that, when executed by a computer, cause the computer to perform a method comprising:

obtaining second image data by rendering page-description language (PDL) data included in a print job;

obtaining first image data at least by imparting noises to the obtained second image data and converting the noises-imparted second image data into an image of a low-resolution, wherein a resolution of the first image is lower than a resolution of the second image; and generating a neural network for converting a low-resolution image into a high-resolution image by performing learning based on a pair of the obtained first image data and the obtained second image data.

15. The method according to claim 8, wherein the noise imparting processing includes processing for imparting random noise to the obtained second image data.

16. The method according to claim 8, wherein the first image data is obtained by imparting noises to the obtained second image data, converting the noises-imparted second image data into an image of a low-resolution and further applying binarization processing to the converted image of the low-resolution.

17. The method according to claim 8, wherein the noise imparting processing includes processing for imparting respective independent random noises to a surrounding region of a foreground region of the obtained second image data and an inside region of the foreground region of the obtained second image data.

18. The non-transitory computer-readable storage medium according to claim 11, wherein the noise imparting processing includes processing for imparting random noise to the obtained second image data.

19. The non-transitory computer-readable storage medium according to claim 11, wherein the first image data is obtained by imparting noises to the obtained second image data, converting the noises-imparted second image data into an image of a low-resolution and further applying binarization processing to the converted image of the low-resolution.

20. The non-transitory computer-readable storage medium according to claim 11, wherein the noise imparting processing includes processing for imparting respective independent random noises to a surrounding region of a foreground region of the obtained second image data and an inside region of the foreground region of the obtained second image data.

* * * * *